(12) United States Patent
Pinto et al.

(10) Patent No.: US 12,481,612 B2
(45) Date of Patent: Nov. 25, 2025

(54) MECHANISM TO IDENTIFY FPGA AND SSD PAIRING IN A MULTI-DEVICE ENVIRONMENT

(71) Applicant: Samsung Electronics Co., Ltd., Suwon-si (KR)

(72) Inventors: Oscar P. Pinto, San Jose, CA (US); Ramdas P. Kachare, Pleasanton, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 276 days.

(21) Appl. No.: 17/230,978

(22) Filed: Apr. 14, 2021

(65) Prior Publication Data

US 2021/0303498 A1 Sep. 30, 2021

Related U.S. Application Data

(63) Continuation of application No. 16/435,442, filed on Jun. 7, 2019, now Pat. No. 10,990,554, which is a
(Continued)

(51) Int. Cl.
*G06F 13/40* (2006.01)
*G06F 13/16* (2006.01)
*G06F 13/42* (2006.01)

(52) U.S. Cl.
CPC ...... *G06F 13/4022* (2013.01); *G06F 13/1668* (2013.01); *G06F 13/4282* (2013.01); *G06F 2213/0026* (2013.01)

(58) Field of Classification Search
CPC ............. G06F 13/4022; G06F 13/1668; G06F 13/4282; G06F 2213/0026; G06F 13/4248
See application file for complete search history.

(56) References Cited

U.S. PATENT DOCUMENTS 7,681,105 B1 3/2010 Sim-Tang et al.
8,417,880 B2 4/2013 Lam et al.
(Continued)

FOREIGN PATENT DOCUMENTS

CN 201242739 5/2009
CN 102446154 A 5/2012
(Continued)

OTHER PUBLICATIONS

Aggarwal, Vaneet et al., Sprout: A functional caching approach to minimize service latency in erasure-coded storage, Jul. 21, 2017, 16 pages.
(Continued)

*Primary Examiner* — Tim T Vo
*Assistant Examiner* — Richard B Franklin
(74) *Attorney, Agent, or Firm* — Renaissance IP Law Group LLP

(57) ABSTRACT

A system is disclosed. The system may include a Solid State Drive (SSD) and a co-processor. The SSD may include storage for data, storage for a unique SSD identifier (ID), and storage for a unique co-processor ID. The co-processor include storage for the unique SSD ID, and storage for the unique co-processor ID. A hardware interface may permit communication between the SSD and the co-processor.

12 Claims, 16 Drawing Sheets

Related U.S. Application Data continuation-in-part of application No. 16/260,087, filed on Jan. 28, 2019, now Pat. No. 11,860,672, which is a continuation-in-part of application No. 16/226,629, filed on Dec. 19, 2018, now Pat. No. 10,838,885, which is a continuation of application No. 16/207,080, filed on Nov. 30, 2018, now Pat. No. 10,635,609.

(60) Provisional application No. 62/818,096, filed on Mar. 13, 2019, provisional application No. 62/745,261, filed on Oct. 12, 2018, provisional application No. 62/733,077, filed on Sep. 18, 2018, provisional application No. 62/638,040, filed on Mar. 2, 2018.

(56) References Cited

U.S. PATENT DOCUMENTS

| | | |
|---|---|---|
| 8,543,752 B2 | 9/2013 | Cong et al. |
| 8,560,792 B2 | 10/2013 | Jennas, II et al. |
| 8,572,320 B1 | 10/2013 | Maheshwari |
| 8,650,359 B2 | 2/2014 | Vaghani et al. |
| 8,850,114 B2 | 9/2014 | Rosenband et al. |
| 8,850,161 B2 | 9/2014 | Punkunus et al. |
| 8,954,657 B1 | 2/2015 | Asnaashari et al. |
| 8,954,658 B1 | 2/2015 | Asnaashari et al. |
| 8,966,164 B1 | 2/2015 | Asnaashari et al. |
| 9,009,397 B1 | 4/2015 | Asnaashari et al. |
| 9,208,032 B1* | 12/2015 | McAlister .............. G06Q 40/04 |
| 9,223,734 B2 | 12/2015 | Subramaniyan et al. |
| 9,235,468 B2 | 1/2016 | Mao |
| 9,244,617 B2 | 1/2016 | Bux et al. |
| 9,298,648 B2 | 3/2016 | Johnson et al. |
| 9,311,110 B2 | 4/2016 | Tamir et al. |
| 9,336,173 B1 | 5/2016 | Sodke et al. |
| 9,384,093 B1 | 7/2016 | Aiello |
| 9,477,466 B2 | 10/2016 | Nishimoto et al. |
| 9,569,118 B2 | 2/2017 | Camp et al. |
| 9,678,842 B2 | 6/2017 | Zhang et al. |
| 9,712,619 B2 | 7/2017 | Malwankar et al. |
| 9,792,047 B2 | 10/2017 | Asnaashari et al. |
| 9,792,073 B2 | 10/2017 | Asnaashari et al. |
| 9,801,219 B2 | 10/2017 | Sonnino et al. |
| 9,880,929 B2 | 1/2018 | Roesch |
| 9,940,280 B1 | 4/2018 | O'Brien et al. |
| 9,959,062 B1 | 5/2018 | Piszczek et al. |
| 9,990,284 B2 | 6/2018 | Watanabe et al. |
| 10,007,443 B1 | 6/2018 | Rajadnya et al. |
| 10,101,924 B2 | 10/2018 | Asnaashari et al. |
| 10,140,063 B2 | 11/2018 | Worley et al. |
| 10,255,134 B2 | 4/2019 | Olarig et al. |
| 10,275,180 B2 | 4/2019 | Ballapuram et al. |
| 10,346,041 B2 | 7/2019 | Olarig et al. |
| 10,382,203 B1* | 8/2019 | Loladia ................... H04L 63/06 |
| 10,417,092 B2 | 9/2019 | Brennan et al. |
| 10,481,834 B2 | 11/2019 | Olarig et al. |
| 10,483,805 B2* | 11/2019 | Kahlman ................ H04B 5/26 |
| 10,552,090 B2 | 2/2020 | Karr et al. |
| 10,623,246 B1* | 4/2020 | Iyer ..................... H04L 41/0806 |
| 10,635,450 B2 | 4/2020 | Lee et al. |
| 10,635,609 B2 | 4/2020 | Olarig et al. |
| 10,956,346 B1* | 3/2021 | Ben-Yehuda ....... G06F 13/4027 |
| 11,042,442 B2 | 6/2021 | Olarig et al. |
| 11,592,991 B2 | 2/2023 | Brennan et al. |
| 2005/0066118 A1 | 3/2005 | Perry et al. |
| 2006/0284982 A1* | 12/2006 | Bigioi ................ H04N 1/00217 |
| | | 348/207.1 |
| 2009/0037609 A1 | 2/2009 | Riley et al. |
| 2009/0037617 A1 | 2/2009 | Riley et al. |
| 2010/0241781 A1 | 9/2010 | Wetzel et al. |
| 2011/0082949 A1 | 4/2011 | Matthews et al. |
| 2011/0125615 A1 | 5/2011 | Shirbabadi et al. |
| 2012/0102580 A1 | 4/2012 | Bealkowski |
| 2013/0054867 A1 | 2/2013 | Nishita |
| 2013/0054889 A1 | 2/2013 | Vaghani et al. |
| 2013/0232293 A1 | 9/2013 | Nguyen et al. |
| 2014/0022849 A1 | 1/2014 | Krutzik et al. |
| 2014/0244843 A1 | 8/2014 | Cao et al. |
| 2014/0273845 A1* | 9/2014 | Russell .................. H04W 76/14 |
| | | 455/41.2 |
| 2014/0337540 A1 | 11/2014 | Johnson et al. |
| 2014/0351654 A1 | 11/2014 | Zhang et al. |
| 2015/0095554 A1 | 4/2015 | Asnaashari et al. |
| 2015/0095555 A1 | 4/2015 | Asnaashari et al. |
| 2015/0143038 A1 | 5/2015 | Asnaashari et al. |
| 2015/0169230 A1 | 6/2015 | Asnaashari et al. |
| 2015/0169244 A1 | 6/2015 | Asnaashari et al. |
| 2015/0350167 A1* | 12/2015 | Djakovic ............ H04L 61/5092 |
| | | 713/163 |
| 2016/0036623 A1* | 2/2016 | Clarkson ............. G06F 11/2069 |
| | | 714/4.11 |
| 2016/0062914 A1 | 3/2016 | Um et al. |
| 2016/0085458 A1 | 3/2016 | Skandakumaran et al. |
| 2016/0259597 A1 | 9/2016 | Worley et al. |
| 2017/0031835 A1 | 2/2017 | Serebrin |
| 2017/0031857 A1 | 2/2017 | Qiu |
| 2017/0052916 A1 | 2/2017 | Kollu |
| 2017/0124077 A1 | 5/2017 | Watanabe et al. |
| 2017/0177222 A1 | 6/2017 | Singh et al. |
| 2017/0185350 A1 | 6/2017 | Waidhofer et al. |
| 2017/0322898 A1 | 11/2017 | Lin et al. |
| 2017/0371571 A1 | 12/2017 | Danilov et al. |
| 2018/0054305 A1* | 2/2018 | Djakovic ............ H04L 63/0869 |
| 2018/0095915 A1 | 4/2018 | Prabhakar et al. |
| 2018/0144377 A1* | 5/2018 | Patenaude ............... H04W 4/02 |
| 2018/0150256 A1 | 5/2018 | Kumar et al. |
| 2018/0173466 A1 | 6/2018 | Yang et al. |
| 2018/0210785 A1 | 7/2018 | Olarig et al. |
| 2018/0225230 A1* | 8/2018 | Litichever ............... G06F 21/82 |
| 2018/0239540 A1 | 8/2018 | Kachare et al. |
| 2018/0260135 A1 | 9/2018 | Hayashida et al. |
| 2018/0321876 A1 | 11/2018 | Ballapuram et al. |
| 2018/0322285 A1 | 11/2018 | Olarig et al. |
| 2018/0335958 A1* | 11/2018 | Wu ..................... G06F 13/4022 |
| 2018/0341619 A1 | 11/2018 | Slik |
| 2018/0357018 A1 | 12/2018 | Karr et al. |
| 2018/0373669 A1 | 12/2018 | Nash et al. |
| 2019/0005176 A1 | 1/2019 | Illikkal et al. |
| 2019/0042090 A1 | 2/2019 | Raghunath et al. |
| 2019/0050289 A1 | 2/2019 | Kachare et al. |
| 2019/0073141 A1 | 3/2019 | Brennan et al. |
| 2019/0073162 A1 | 3/2019 | Karr et al. |
| 2019/0073265 A1 | 3/2019 | Brennan et al. |
| 2019/0196909 A1 | 6/2019 | Olarig et al. |
| 2019/0227744 A1 | 7/2019 | Olarig et al. |
| 2019/0272215 A1 | 9/2019 | Olarig et al. |
| 2019/0310953 A1 | 10/2019 | Olarig et al. |
| 2019/0310957 A1 | 10/2019 | Olarig et al. |
| 2019/0310958 A1 | 10/2019 | Pinto et al. |
| 2020/0042252 A1 | 2/2020 | Olarig et al. |
| 2020/0065285 A1 | 2/2020 | Panella et al. |
| 2020/0065473 A1* | 2/2020 | Berdy ..................... G06F 21/73 |
| 2020/0379930 A1 | 12/2020 | Brownell et al. |
| 2022/0066652 A1 | 3/2022 | Danilov et al. |
| 2022/0365683 A1 | 11/2022 | Olarig et al. |

FOREIGN PATENT DOCUMENTS

| | | |
|---|---|---|
| CN | 103262019 A | 8/2013 |
| CN | 103765370 A | 4/2014 |
| CN | 104683430 A | 6/2015 |
| CN | 105721621 A | 6/2016 |
| CN | 106980348 A | 7/2017 |
| CN | 108334285 A | 7/2018 |
| EP | 2711845 A2 | 3/2014 |
| JP | 2014063497 A | 4/2014 |
| JP | 2014071478 A | 4/2014 |
| JP | 2017037500 A | 2/2017 |
| JP | 2018045688 A | 3/2018 |
| KR | 20160106501 A | 9/2016 |
| KR | 20180019806 A | 2/2018 |
| TW | 201250486 A | 12/2012 |

(56) References Cited

FOREIGN PATENT DOCUMENTS

| | | |
|---|---|---|
| TW | 201823916 A | 7/2018 |
| WO | 2018086171 A1 | 5/2018 |
| WO | 2018201249 A1 | 11/2018 |

OTHER PUBLICATIONS

Chen, Zhangglio, et al. "Using FPGA to Accelerate Deduplication on High-Performance SSD," Advanced Materials Research, vol. 1042, Trans Tech Publications, Ltd., Oct. 2014, pp. 212-217 (1 page included), Crossref, https://doi.org/10.4028/www.scientific.net/amr.1042.212. (Year: 2014).
Da Silva, Bruno et al., "Comparing and Combining GPU and FPGA Accelerators in an Image Processing Context," IEEE, Erasmus University College, IWT Dept., Brussels, Belgium (Year: 2013).
Final Office Action for U.S. Appl. No. 16/260,087, mailed Jul. 9, 2020.
Final Office Action for U.S. Appl. No. 16/435,442, mailed Sep. 17, 2020.
Halalai, Raluca et al., "Agar: A Caching System for Erasure-Coded Data", 37th IEEE International Conference on Distributed Computing Systems, Jun. 2017, 12 pages.
Notice of Allowance for U.S. Appl. No. 16/207,080, mailed Dec. 17, 2019.
Notice of Allowance for U.S. Appl. No. 16/226,629, mailed Jul. 8, 2020.
Notice of Allowance for U.S. Appl. No. 16/435,442, mailed Dec. 31, 2020.
Office Action for U.S. Appl. No. 16/207,080, mailed Jun. 6, 2019.
Office Action for U.S. Appl. No. 16/226,629, mailed Feb. 27, 2020.
Office Action for U.S. Appl. No. 16/260,087, mailed Feb. 21, 2020.
Office Action for U.S. Appl. No. 16/435,442, mailed Mar. 5, 2020.
Sathiamoorthy, Maheswaran, "Dummies Guide to Erasure Coding", Jul. 1, 2012, 5 pages.
Final Office Action for U.S. Appl. No. 16/260,087, mailed May 2, 2022.
Office Action for U.S. Appl. No. 16/260,087, mailed Dec. 9, 2022.
Office Action for U.S. Appl. No. 16/260,087, mailed Dec. 22, 2021.
Corrected Notice of Allowability for U.S. Appl. No. 16/260,087, mailed Sep. 1, 2023.
Notice of Allowance for U.S. Appl. No. 16/260,087, mailed Aug. 7, 2023.
Corrected Notice of Allowability for U.S. Appl. No. 16/260,087, mailed Nov. 22, 2023.
Office Action for U.S. Appl. No. 18/513,610, mailed Jun. 10, 2024.
Office Action for U.S. Appl. No. 18/513,610, mailed Nov. 14, 2024.
Notice of Allowance for U.S. Appl. No. 18/513,610, mailed Aug. 26, 2025.
Chan, Jeremy C.W. et al., "Parity Logging with Reserved Space: Towards Efficient Updates and Recovery in Erasure-coded Clustered Storage," 12th USENIX Conference on File and Storage Technologies (FAST '14), Feb. 2014, 15 pages.
Final Office Action for U.S. Appl. No. 18/513,610, mailed May 12, 2025.
Haddock, Walker et al., "GPU Erasure Coding for Campaign Storage," Springer International Publishing AG, Oct. 2017, 14 pages.
Sipos, Marton et al., "Erasure Coded Storage on a Changing Network: the Untold Story," 2016 IEEE Global Communications Conference (GLOBECOM), Dec. 2016, 6 pages.

\* cited by examiner

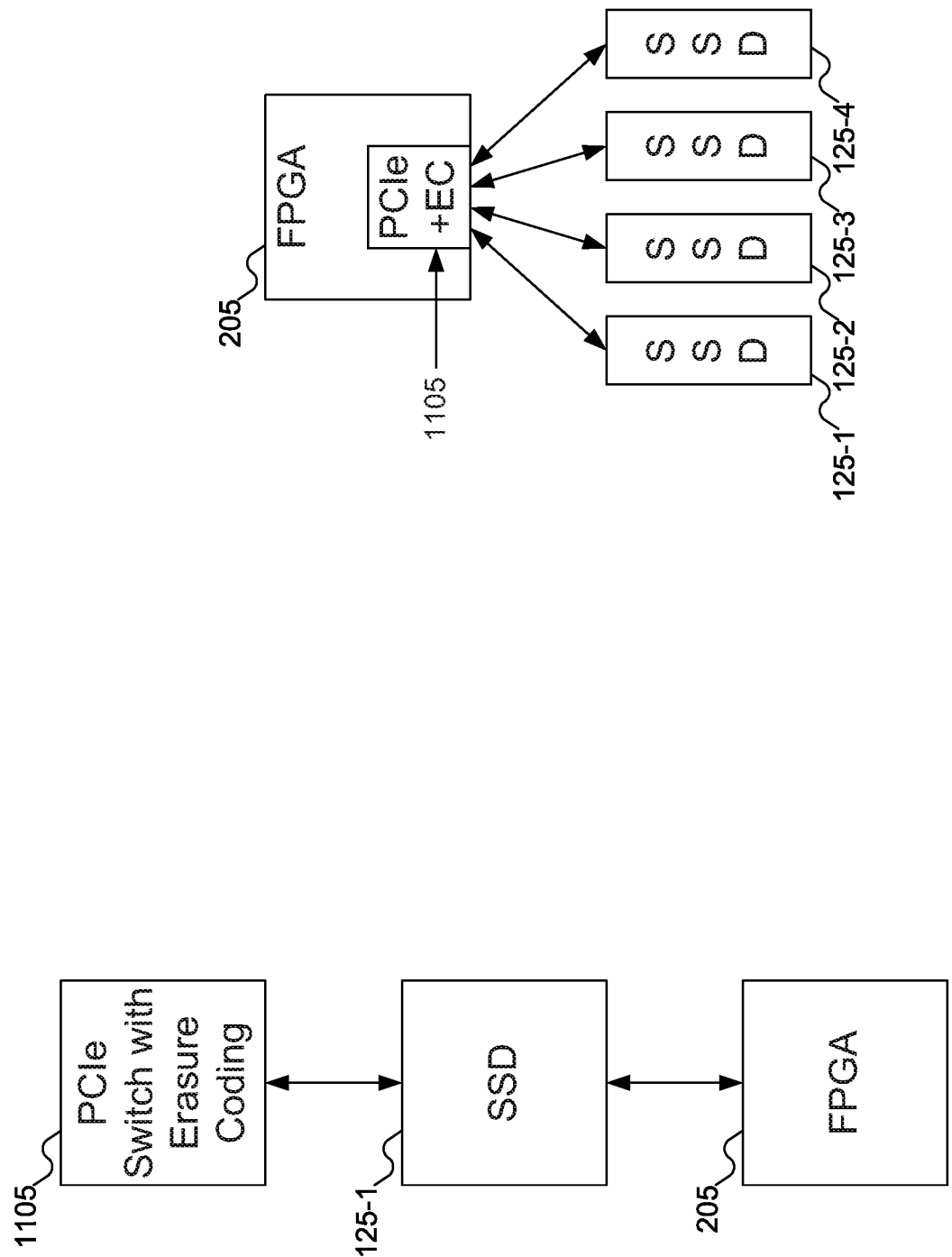

MECHANISM TO IDENTIFY FPGA AND SSD PAIRING IN A MULTI-DEVICE ENVIRONMENT

RELATED APPLICATION DATA

This application is a continuation of U.S. patent application Ser. No. 16/435,442, filed Jun. 7, 2019, now allowed, which is a continuation-in-part of U.S. patent application Ser. No. 16/260,087, filed Jan. 28, 2019, now pending, which is a continuation-in-part of U.S. patent application Ser. No. 16/226,629, filed Dec. 19, 2018, now U.S. Pat. No. 10,838,885, issued Nov. 17, 2020, which is a continuation of U.S. patent application Ser. No. 16/207,080, filed Nov. 30, 2018, now U.S. Pat. No. 10,635,609, issued Apr. 28, 2020, which claims the benefit of U.S. Provisional Patent Application Ser. Nos. 62/745,261, filed Oct. 12, 2018, and 62/638,040, filed Mar. 2, 2018, all of which are incorporated by reference herein for all purposes.

U.S. patent application Ser. No. 16/435,442, filed Jun. 7, 2019, now allowed claims the benefit of U.S. Provisional Patent Application Ser. No. 62/733,077, filed Sep. 18, 2018, and U.S. Provisional Patent Application Ser. No. 62/818,096, filed Mar. 13, 2019, both of which are incorporated by reference herein for all purposes.

FIELD

The inventive concepts relate generally to computer systems, and more particularly to systems including storage devices and co-processors.

BACKGROUND

Field Programmable Gate Array (FPGA) and Solid State Drive (SSD) sub-devices are often (although not always) packaged in one device enclosure for form factor, power, density, and performance benefits. The FPGA and SSD appear as separate physical functions (PFs) in the host's Peripheral Component Interconnect (PCI) view. The FPGA and SSD sub-devices are also populated on separate Input/Output (I/O) stacks-specifically, storage and OpenCL—that have no co-relation.

A form factor including both an FPGA and an SSD device will expose three physical functions (PFs): Data PF (also called User Space PF), Management PF, and Non-Volatile Memory Express (NVMe) PF. The first two PFs are for the FPGA; the third PF is for the SSD.

Where a machine includes only one FPGA/SSD pair, the separate PFs are a non-issue for pairing identification (for example, in an x86 host server). But when more than one device exists (again, for example, in a densely populated x86 host server), there is no indication of which FPGA is paired with which SSD. The problem is more severe in a virtualized environment when PCIe pass-through is enabled and multi-function devices appear as multiple single function devices.

Pairing is required for peer-to-peer (p2p) computing to function properly. Without pairing, p2p will fail since data may get loaded in the wrong FPGA device context, leading to the hardware kernel not having the right data. The problem becomes severe when the host user may not identify in the pairing requirements the application.

A need remains to establish the pairing of FPGA and other co-processors with storage devices such as SSDs.

BRIEF DESCRIPTION OF THE DRAWINGS

FIG. 11 shows a first topology including the SSD of FIG. 1 and the co-processor of FIG. 1, according to one embodiment of the inventive concept.

FIG. 12 shows a second topology including the SSD of FIG. 1 and the co-processor of FIG. 1, according to another embodiment of the inventive concept.

DETAILED DESCRIPTION

Figure 1:
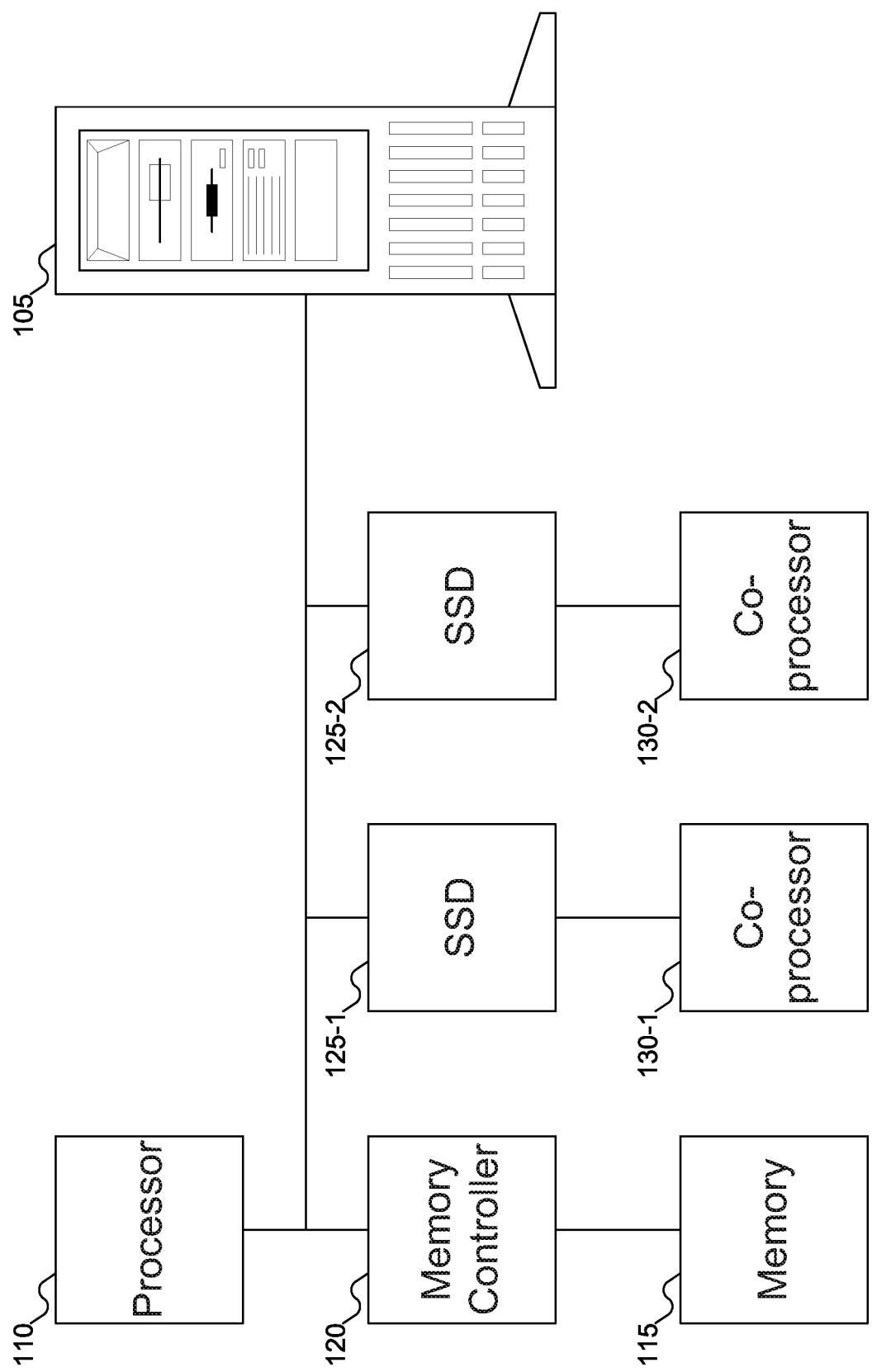
FIG. 1 shows a machine designed to support pairing of storage devices and co-processors, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

When more than one Solid State Drive (SSD)/Field Programmable Gate Array (FPGA) pair of devices are available on the same server, a possibility exists that the host application user may choose the peering buffer and SSD on two separate such pairings. This choice will result in data corruption and incorrect results with acceleration. The SSD/FPGA pair exposes three physical functions (PFs): Data PF (also called User Space PF) (for the FPGA), Management PF (for the FPGA), and Non-Volatile Memory Express (NVMe) PF (for the SSD). If all three PFs are based off the same device, this problem may be mitigated. But using the Xilinx 3-port switch design approach, the FPGA and SSD may show up as separate devices with no details on their physical association. (Xilinx is a registered trademark of Xilinx.) The matter gets further complicated due to the OpenCL software interface that Xilinx exposes to its applications. The software interface virtualizes the bus/device/function (BDF) details and shows each FPGA device by logical numbers, such as 0, 1, 2, and so forth. This additional indirection at the software level totally obfuscates the pairing associations that could be previously deduced at the Peripheral Component Interconnect (PCI) BDF level. The application or user must be knowledgeable in knowing the multi-function device associations at the PCI BDF level, Xilinx driver internals, and the file system level mapping intricacies.

This arrangement is error prone and manifests itself with different issues based on the environment being used. This arrangement may also be cumbersome to debug since the peering requests may still succeed for the user.

Densely Populated System

In the case above, it is expected that all devices are under the same root complex. But a system that is densely populated with SSD/FPGA devices may require the utilization of more than one PCI Express (PCIe) switch configured under each root complex that is connected to each CPU socket. With Access Control Service (ACS), which may be utilized in the virtualization context, and varied support by CPU/chipsets, peering is not uniformly supported, placing a burden on the application user to understand these nuances in topologies.

p2p transfer from an SSD to a P2P-Dial on Demand Routing (DDR) may fail as it may not be supported. This consequence results from the fact that PCI Root complexes are not required to support forwarding packets between Root ports. This design choice is good in practice for p2p usage in the storage acceleration context, but bad for user experience.

Dense SSD/FPGA deployments may be built with any Intel/AMD solutions by various system vendors, and there may be limited or no control regarding how systems will interact. This fact may create complexity on what works and what does not.

PCI Pass-Through in a Virtualized Environment

In certain Linux virtualization environments, a multi-function device, such as an SSD/FPGA device, when mapped with pass-through attributes to a Virtual Machine (VM) may appear as separate single-function devices for each physical function. So the three PFs exposed between the SSD and the FPGA may be mapped as three single-function devices with no association between them.

User without PCI Knowledge

In addition to the cases above, an application user may not be knowledgeable enough to know the BDF associations. This fact may be due to the user being a high-level application user who does not need to be educated with this level of system details. This problem opens up a situation where a high level abstraction may be required to solve this knowledge gap.

Proposed Solution

An SSD/FPGA device may be considered a new SSD device class by providing near storage acceleration and distinguishing itself from other standalone SSDs and FPGAs. The new device may need a clear way of identifying itself, i.e., is it a FPGA with near storage or is an NVMe SSD with near acceleration? The solution may include:

A low level device interface change, including: a private hardware interface like System Management Bus (SMBus) between the FPGA and the SSD to share properties; a small update for NVMe SSD firmware to accommodate acceleration attributes; and an update to FPGA firmware to query the SSD and advertise SSD identify pairing attribute.

A high-level software interface change, including an interface to the FPGA that may query low level pairing details, expose NVMe identify controller new properties to existing software paths, and enhance manageability software modules to query the FPGA and the SSD for pairing.

An API enabled for adopting ecosystem, including application interface calls that may identify pairing by device name, file name etc.

These changes should be minimal enough to keep the NVMe SSD as generic as needed. For example, an existing NVMe SSD may be reprogrammed to be accommodated as the SSD in an SSD/FPGA device.

Changes to NVMe SSD for Pairing with FPGA

A minor hardware change enables the FPGA and the SSD to talk to each other.

The SSD Controller may support two SMBus Master interfaces (as shown and discussed below with reference to FIGS. 7-8 and the accompanying text). One SMBus Master interface may be connected to the external SMBus (out-of-band (OOB)) coming through the connector from Board Management Controller (BMC) or such management entity.

The second SMBus master port on the SSD may be is connected to the slave or master SMBus port on the FPGA device. The out of band (OOB) SMBus interface may be used to implement management protocol such as NVMe Management Interface (NMVe-MI). The internal SMBus interface between the SSD Controller and the FPGA may be used exclusively for communication between these two devices. The SSD Controller firmware may query the FPGA device for its unique identification information. This interface may also be used for configuration, status, and monitoring of the FPGA device by the SSD Controller under guidance from the BMC or host. When the host or BMC queries FPGA identification information using a management protocol such as NVMe-MI to the SSD Controller, the SSD Controller in turn may fetch the necessary information from the FPGA and returns that to the host or BMC.

The SSD Controller may use a message based protocol to communicate with the FPGA device. The SSD Controller may write various command messages to the slave SMBus port of the FPGA and then polls for the response availability. When the FPGA response message is ready, the SSD Controller reads the response message out. When the FPGA needs the attention of the SSD Controller, the FPGA may set a flag, which is periodically polled by the SSD Controller.

A small change accommodated in the SSD firmware may support the above hardware setting. PCIe device initialization completion occurs first in the embedded operating system (O/S) environment within the multifunction device. Later on, the multi-function device gets initialized again in the x86 host's context.

As part of the PCIe init phase, a software component (firmware in the SSD device) may query and discover the local and attached devices to the multi-function device. On initialization completion of the NVMe SSD and FPGA components, the software component may query the FPGA for its device details that provide the unique serial number and product part numbers.

These details may be written to the SSD registers at a private offset in its memory mapped NVMe Base Address Register (BAR) space. A write window may be made available by the SSD firmware after a reset but before PCI configuration accesses are made to accommodate this update. This will keep the update internal and within the control of the embedded O/S.

NVMe specifications define Identify Controller and Namespace commands to discover an NVMe SSD's capabilities. As part of these capabilities, the controller may define the following to advertise its acceleration capabilities.

TABLE 1

Identify Controller Data Structure

| Bytes | Optional/Mandatory | Description |
|---|---|---|
| 4095:4031 | O (Vendor Specific) | Accelerator Capabilities |

TABLE 2

Extended Features

| Byte | Type | Reset | Description |
|---|---|---|---|
| 3:0 | RO | 0 h | Vendor Signature |
| 4 | RO | 1 h | Extended Features present |
| 6:5 | RO | Imp. Specific | Compute type: FPGA |
| 10:7 | RO | Imp. Specific | Device count, exclusive/shared, enabled |

TABLE 2-continued

Extended Features

| Byte | Type | Reset | Description |
|---|---|---|---|
| 12:11 | RO | Imp. Specific | Compute type: cpu-ARM |
| 16:13 | RO | Imp. Specific | Device count, exclusive/shared, enabled |

TABLE 3

Accelerator Capabilities

| Byte | Type | Reset | Description |
|---|---|---|---|
| 3:0 | RO | 0 h | Vendor Signature |
| 4 | RO | 1 h | Acceleration device is enabled and available |
| 6:5 | RO | 100 h | Major version, Minor version |
| 7 | RO | 1 h | Current status |
| 9:8 | RO | 0 h | Reserved |
| 25:10 | RO | Imp. Specific | Accelerator Part Number as reported in FPGA VPD details |
| 29:26 | RO | Imp. Specific | Part Vendor ID, Device ID |
| 33:30 | RO | Imp. Specific | Acceleration Feature 1 (TBD) |
| 63:34 | RO | 0 h | reserved |

Changes to FPGA to Advertise SSD Device Pairing

Similar to the NVMe SSD, the FPGA may be programmed with the unique SSD details by the embedded O/S component. These details may be available to x86 host software component through an interface.

Embedded O/S Component for Pairing

A software component (also firmware in the SSD) may query and discover the local and attached devices to the multi-function device. On initialization completion of the NVMe SSD and FPGA components, the software component may query the FPGA for its device details that provide the unique serial number and product part numbers. These details may be written to the SSD registers at a private offset in its memory mapped NVMe BAR space. Similarly, the software component may program the FPGA with the unique SSD details so that they are paired with each other.

Sample Enumeration at Power-ON/RESET on SMBus
1. FPGA issues NVMe (read Identify Controller) to SSD
2. SSD responds with Identify Data
3. FPGA saves serial number, model number details
4. FPGA issues NVMe (Set Identify Data-Offset Extended Features-vendor specific 3072-4095 bytes), including:
    Extended features present
    compute—type: FPGA, count, exclusive/shared
    compute—type: cpu-ARM, count, exclusive/shared
5. SSD confirms NVMe (Set Identify Data)
6. FPGA issues NVMe (Set LogPage-compute_FPGA), including:
    Serial number, model number
    Hardware capabilities—LUTs, BRAM, URAM, Reg, DSP, DRAM
7. SSD confirms NVMe (Set LogPage-compute_FPGA)

A private interface may exist between the x86 host software and this component for additional queries on pairing and other features.

Manageability Software Changes to Accommodate New Pairing

The BMC conventionally interfaces with the SSD on the SMBus. This interface may be extended to accommodate the FPGA pair and additionally features and other attributes for usability and manageability.

Sample flows:
1. BMC issues NVMe (read LogPage Temp2) to SSD
2. SSD requests FPGA with Read Temperature Sensor
3. FPGA returns temperature data
4. SSD returns LogPage data
5. BMC issues NVMe (read LogPage FPGA utilization) to SSD
6. SSD requests FPGA with Read FPGA Utilization
7. FPGA returns utilization data
8. SSD returns LogPage data X86 Host Software Component for Pairing This software component may be available as a library and may provide the pairing details between the NVMe SSD and FPGA that co-exist in the multi-function device. The component may work with the x86 SDAccel runtime drivers and libraries to provide the pairing details.

The OpenCL interface as of today does not expose the BDF level details of the device but rather provides a logical abstraction by numbers starting from offset 0. The interface may change internally by the provider to query the low level details just exposed in hardware and in doing so may also provide pairing details for the compute side. Here the vendor may be responsible for the interface changes.

Command Line Tool to Query Pairing

The command-line tool may provide details such as those shown in Table 4 below when run without any options. The two I/O stacks and their programmable device reference are reflected in the details. The NVMe SSD/dev/nvme2 is paired with acceleration device at index zero. It should be noted as shown on this server that the SSD device order is not incremental as the FPGA acceleration device.

TABLE 4

Command Line Tool Output

| Device pairing info: | |
|---|---|
| NVMe Device | Acceleration Device (clGetDeviceIDs index) |
| /dev/nvme2 | 0 |
| /dev/nvme1 | 1 |

The command-line tool may also support a verbose option that shows additional details more important to a field personal like a system administrator. These additional details may include NVMe SSD attributes that are unique across this class of devices such as serial number, model and firmware details and namespace and partition mapping information. A unique set of details also provided include the PCIe device chain that may identify the slot the device was plugged into. Table 5 below shows an example of such information.

TABLE 4

Command Line Tool Output

```
Device pairing info:
NVMe Device                           Acceleration Device
                                      (clGetDeviceIDs index)
/dev/nvme0
  l................................   0
  1                                    1
  \-[0000:3d:00.0]                    \-[0000:3e:00.0]-[0000:3e:00.1]
    l---> [PCIe EP][Switch DP Slot#0][Switch UP][RP Slot#1] [Numa node 0]
    +-Model: NVMe SSD Model info
    +-Serial#: 0123456789ABCDEF0000
    +-Firmware_rev: FPGASSD0
    +-mappings: /dev/nvme0n1p1        /dev/nvme0n1
/dev/nvme2 1                           1
 1                                     1
 l................................    l
 \-[0000:8e:00.0]                     \-[0000:8f:00.0]-[0000: 8f:00.1]
    l---> [PCIe EP][Switch DP Slot#0][Switch UP][RP Slot #7][Numa node 1]
    +-Model: NVMe SSD Model info
    +-Serial#: 0123456789ABCDEF0000
    +-Firmware_rev: FPGASSD0
    +-mappings: /dev/nvme2n1p1        /dev/nvme2n1
```

For the device/dev/nvme0, the SSD/FPGA device was plugged into slot number 1 that is also close to numa node 0 CPUs. This information may be used for field level analysis as well as at the application level for CPU affinity. This information may also be used to understand the device hierarchy when included in a deeply nested PCIe switch fabric, and may also isolate device issues: for example, for a system administrator.

Advantages

Having a pairing solution for SSD/FPGA devices is beneficial to make such a device more usable. Short term, this pairing solution may address the identification gap. Long term, this pairing solution may help make decisions on how to take the acceleration device forward. This solution may be used for other accelerator types, such as a GPU, embedded CPUs like Advanced Reduced Instruction Set Computer (RISC) Machine (ARM), RISC-V, Tensor Processing Unit (TPU) and specific hardware based accelerators, an NVMe specification extension, or some other mechanism.

FIG. 1 shows a machine designed to support pairing of storage devices and co-processors, according to an embodiment of the inventive concept. In FIG. 1, machine 105 is shown. Machine 105 may include processor 110. Processor 110 may be any variety of processor: for example, an Intel Xeon, Celeron, Itanium, or Atom processor, an AMD Opteron processor, an ARM processor, etc. While FIG. 1 shows a single processor 110 in machine 105, machine 105 may include any number of processors, each of which may be single core or multi-core processors, and may be mixed in any desired combination.

Machine 105 may also include memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any desired combination of different memory types. Memory 115 may be managed by memory controller 120.

Machine 105 may also include storage devices 125-1 and 125-2, which may be controlled by device drivers (not shown). Storage devices 125-1 and 125-2 may be any desired form of storage devices. For example, storage device 125-1 and 125-2 may be a Solid State Drive (SSD), such as a Non-Volatile Memory Express (NVMe) SSD, hard disk drives, or any other desired form of storage device. In addition, storage devices 125-1 and 125-2 may be of different types, manufacturer, and/or model: for example, storage device 125-1 might be an SSD, whereas storage device 125-2 might be a hard disk drive.

Figure 2:
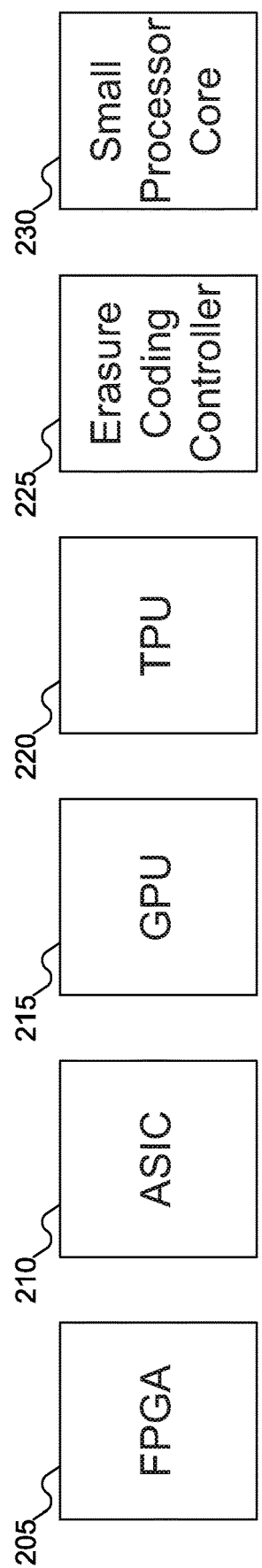
FIG. 2 shows different forms of the co-processors of FIG. 1.

Machine 105 may also include co-processors 130-1 and 130-2. Co-processors 130-1 and 130-2 may provide any desired functions in support of storage devices 125-1 and 125-2. For example, co-processors 125-1 may offer such functionalities as data acceleration, data deduplication, data integrity, data encryption, data compression, and/or erasure coding. Co-processors 130-1 and 130-2 may each offer only one such functionality, or co-processors 130-1 and 130-2 may offer multiple such functionalities each. Co-processors 130-1 and 130-2 may be implemented using any desired component. FIG. 2 shows some example implementations of co-processors 130-1 and 130-2, such as Field Programmable Gate Array (FPGA) 205, Application-Specific Integrated Circuit (ASIC) 210, Graphics Processing Unit (GPU) 215, Tensor Processing Unit (TPU) 220, Erasure Coding Controller 225, and small processor core 230, but embodiments of the inventive concept may include other implementations of co-processor 130-1 and 130-2 as well.

Returning to FIG. 1, while FIG. 1 shows two storage devices with one co-processor for each storage device, embodiments of the inventive concept may include any number of storage devices and any number of co-processors for each storage device, as desired, which may be of different types. In addition, in some embodiments of the inventive concept some storage devices might have co-processors and other storage devices might not have co-processors. But as with only one storage device and one co-processor there is no concern about pairing a storage device and co-processor, most embodiments of the inventive concept include at least two storage devices with corresponding co-processors. In the remainder of this document, the term "pairing" is intended to refer to devices where one device in the pairing supports another device, and should not be understood to limit a pairing to only two devices. For example, if a storage device includes both an FPGA and a GPU, all three devices may be considered "paired". (Alternatively, the FPGA and GPU may be separately considered paired with the common storage device, leaving the association between the FPGA and the GPU to be determined indirectly if needed.)

Although FIG. 1 depicts machine 105 as a server (which could be either a standalone or a rack server), embodiments of the inventive concept may include machine 105 of any desired type without limitation. For example, machine 105 could be replaced with a desktop or a laptop computer or any other machine that may benefit from embodiments of the inventive concept. Machine 105 may also include specialized portable computing machines, tablet computers, smartphones, and other computing machines.

Figure 3:
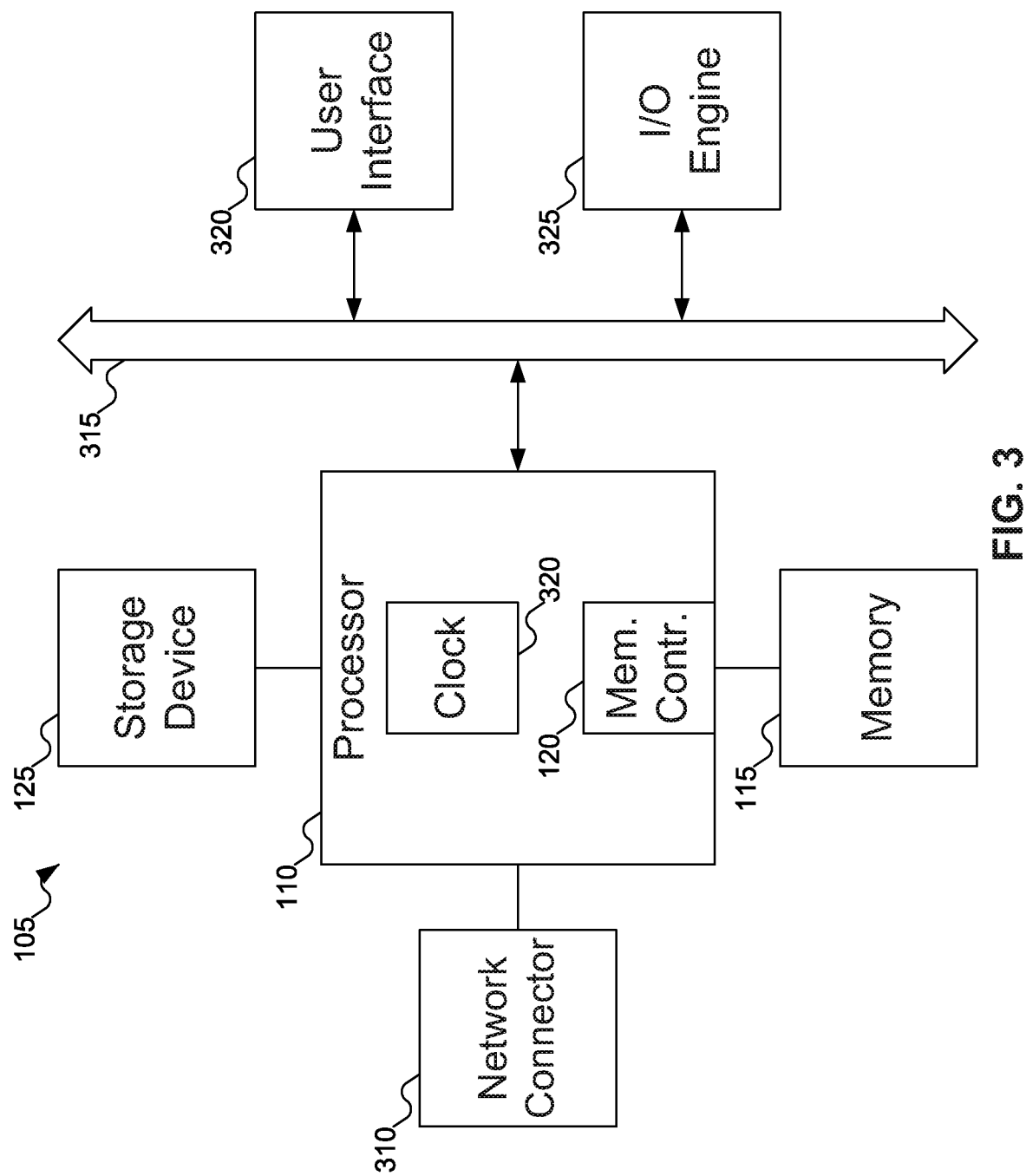
FIG. 3 shows additional details of the machine of FIG. 1.

FIG. 3 shows additional details of the machine of FIG. 1. In FIG. 3, typically, machine 105 includes one or more processors 110, which may include memory controllers 120 and clocks 305, which may be used to coordinate the operations of the components of device 105. Processors 110 may also be coupled to memories 115, which may include random access memory (RAM), read-only memory (ROM), or other state preserving media, as examples. Processors 110 may also be coupled to storage devices 125, and to network connector 310, which may be, for example, an Ethernet connector or a wireless connector. Processors 110 may also be connected to buses 315, to which may be attached user interfaces 320 and Input/Output interface ports that may be managed using Input/Output engines 325, among other components.

Figure 4:
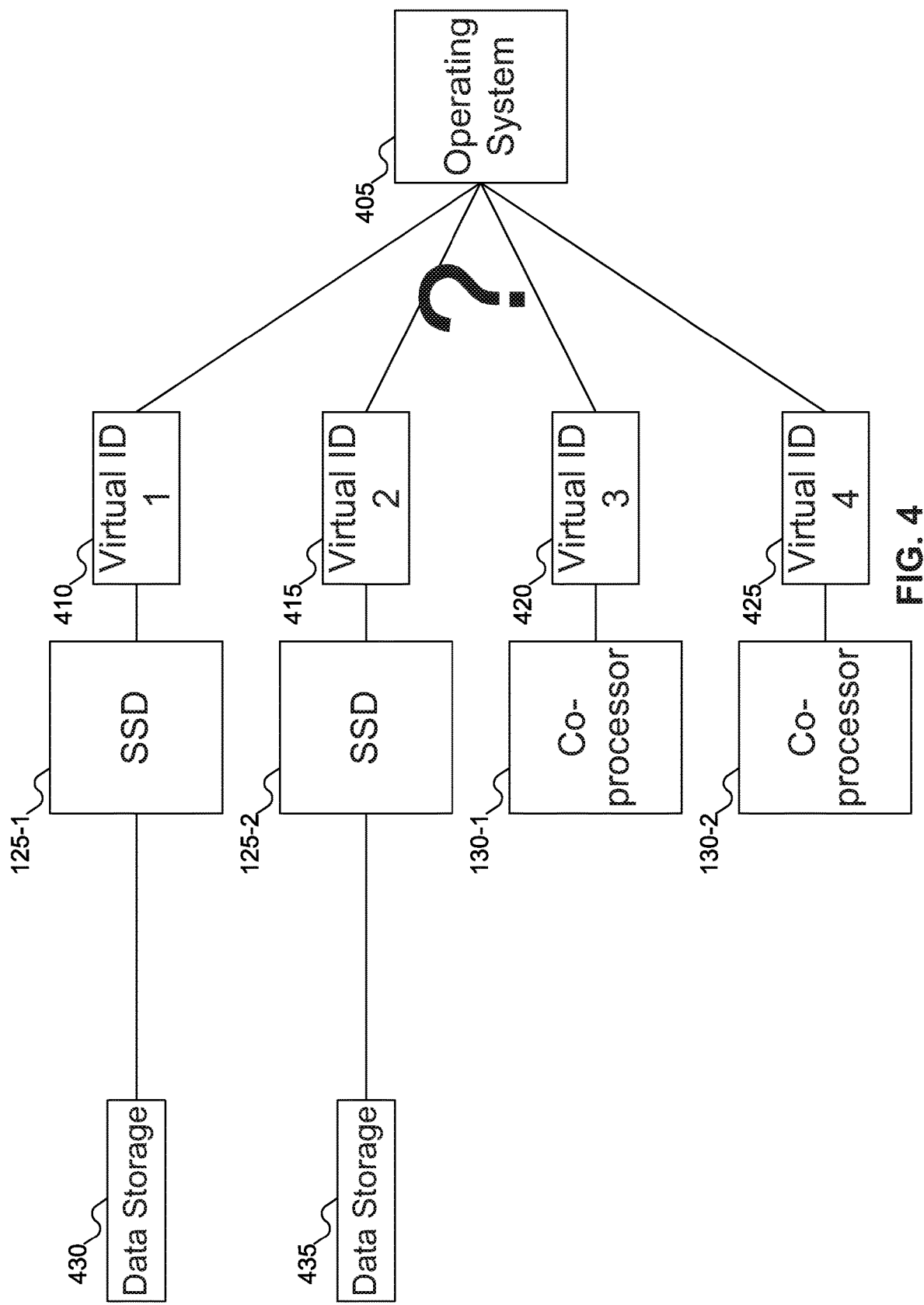
FIG. 4 shows the operating system's view of the devices of FIG. 1.

FIG. 4 shows the operating system's view of the devices of FIG. 1. In conventional systems, operating system 405 identifies SSDs 125-1 and 125-2 and co-processors 130-1 and 130-2 using virtual identifiers (IDs) 410, 415, 420, and 425. (From here onwards, the discussion focuses on SSDs as specific examples of storage devices that might include co-processors, but embodiments of the inventive concept may still extend to storage devices of types other than SSDs.) Virtual IDs 410, 415, 420, and 425 may be assigned during enumeration of the devices by controllers such as Peripheral Component Interconnect (PCI) enumerators, or they may be assigned as part of "constructing" a virtual machine (VM) within machine 105 of FIG. 1 (or both). Either way, operating system 405 has only the information provided as a consequence of virtual IDs 410, 415, 420, and 425. Operating system 405 may know that SSD 125-1, assigned virtual ID 410, may include data storage 430 and that SSD 125-2, assigned virtual ID 415, may include data storage 435, by virtue of the fact that SSDs 125-1 and 125 are SSDs. But operating system 405 may not know that co-processor 125-1, assigned virtual ID 420, is meant to support operations of SSD 125-1, assigned virtual ID 410, or that co-processor 125-2, assigned virtual ID 425, is meant to support operations of SSD 125-2.

Figure 5:
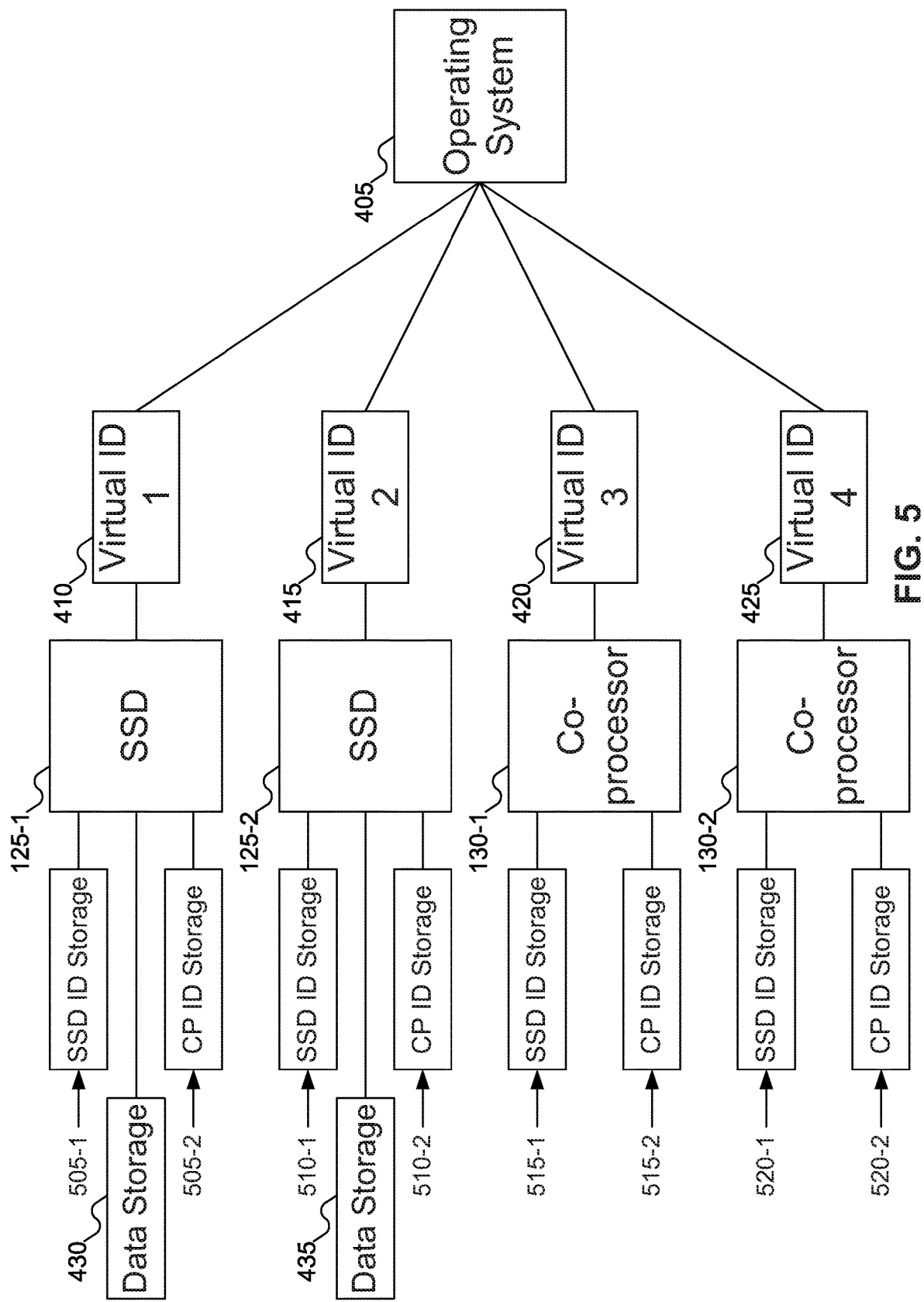
FIG. 5 shows the devices of FIG. 1 equipped to store information about their pairings.

FIG. 5 shows the devices of FIG. 1 equipped to store information about their pairings. In FIG. 5, devices 125-1, 125-2, 130-1, and 130-2 may include storage for various pieces of information related to pairing. Thus, SSD 125-1 may include storage 505-1 and 505-2 for information about itself and its paired co-processor (co-processor 130-1), SSD 125-2 may include storage 510-1 and 510-2 for information about itself and its paired co-processor (co-processor 130-2), co-processor 130-1 may include storage 515-1 and 515-2 for information about itself and its paired SSD (SSD 125-1), and co-processor 130-2 may include storage 520-1 and 520-2 for information about itself and its paired SSD (SSD 125-2). In some embodiments of the inventive concept the information stored in storages 505-1, 505-2, 510-1, 510-2, 515-1, 515-2, 520-1, and 520-2, may include information that is unique to each device, such as a serial number of a globally unique ID (GUID); in other embodiments of the inventive concept storages 505-1, 505-2, 510-1, 510-2, 515-1, 515-2, 520-1, and 520-2 may store information agreed-upon between the paired devices that is unique or almost certainly unique. For example, there are algorithms that enable two parties, over an unsecure connection, to agree to a shared secret to be used in securing communications between the parties: SSD 125-1 and co-processor 130-1 might use such an algorithm to agree to a shared secret that may be used as agreed-upon information. Or SSD 125-1 and co-processor 130-1 might be assigned a common piece of data at the time of manufacture, when they are physically paired. Note that if the paired devices use some unique information that would not be used by other devices, devices 125-1, 125-2, 130-1, and 130-2 might only need to store that unique information, at least for pairing purposes, rather than each storing information about each device in the pairing.

When operating system 405 queries the individual devices for information about themselves, each device may also return information about its pairing. Thus, for example, SSD 125-1 may store its own information in storage 505-1 and information about co-processor 130-1 in storage 505-2; similarly, co-processor 130-1 may store its own information in storage 515-2 and information about SSD 125-1 in storage 515-1. Then, operating system may use the information from storages 505-1, 505-2, 515-1, and 515-2 to determine that SSD 125-1 and co-processor 130-1 are paired. Such information may be, for example, the serial numbers of the various devices or other information that is expected to be unique, such as a GUID or a calculated shared secret. For example, if two (or more) devices each provide their own serial number and their pair's serial number and the serial numbers correspond as expected, then operating system 405 may consider the two devices to be paired. Similarly, if two (or more) devices each provide a unique identifier (or an identifier that may be expected to be unique), then the fact that the devices all provide that identifier may demonstrate that the devices should be considered paired. In this manner, operating system 405 may create pairings of virtual IDs 410, 415, 420, and 425 as appropriate.

Figure 6:
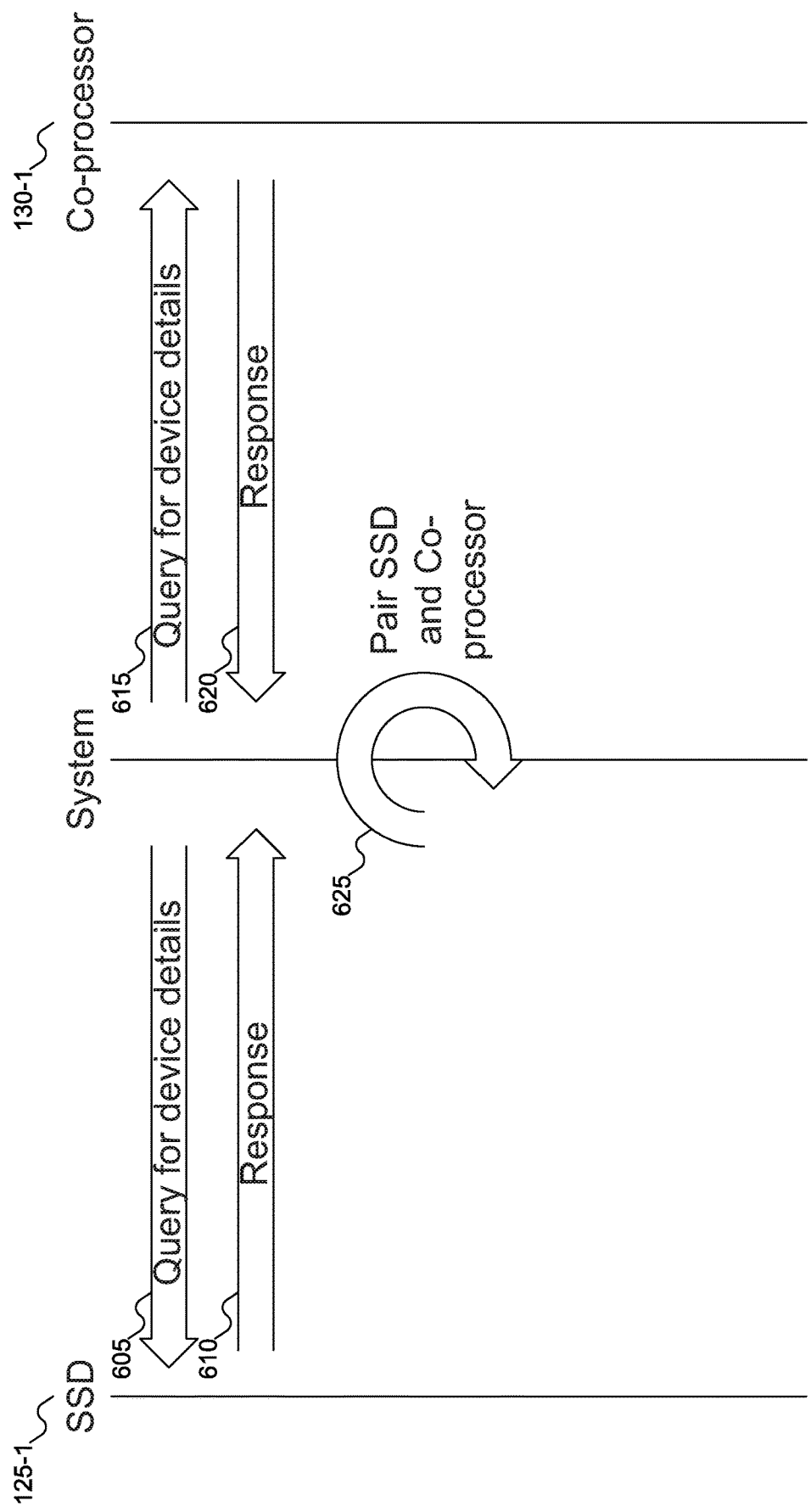
FIG. 6 shows the operating system querying the SSD of FIG. 1 and the co-processor of FIG. 1 and pairing the devices.

FIG. 6 shows operating system 405 of FIG. 5 querying SSD 125-1 of FIG. 1 and co-processor 130-1 of FIG. 1 and pairing the devices. In FIG. 6, operating system 405 may send query 605 to SSD 125-1, asking for its device details. Note that conventional operating systems may query devices to determine device properties and characteristics as part of start-up; the Basic Input/Output System (BIOS) may also query to discover which devices are connected. What is new is that in response 610 SSD 125-1 may include information about itself and information about co-processor 130-1. Similarly, operating system 405 may send query 615 to co-processor 130-1 asking for its device details: co-processor 130-1 may send response 620 that includes information about itself and information about SSD 125-1. When operating system 405 receives responses 610 and 620, operating system 405 may use that information to determine that SSD 125-1 and co-processor 130-1 are paired, as shown in operation 625. Operating system 405 may then store this pairing information.

Once operating system 405 is aware of which storage device is paired with which co-processor, operating system 405 may make this information available to applications and/or users. For example, operating system 405 may offer an Application Programming Interface (API) that applications may use to query operating system 405 for pairing information. For example, an application may send a query asking, for SSD 125-1, which device(s) are paired with that device via the API. Operating system 405 may then respond with the information that co-processor 130-1 is paired with SSD 125-1. Another application might ask for information about the paired devices associated with a particular piece of data: for example, given a particular file (or a key-value object, or data that may be stored in another format on a storage device), which storage device stores that data, and which other devices are paired with that storage device. Operating system may then determine which storage device stores that data and then return information about that storage device and its pairings. (Of course, the application could send two API queries: one to determine the particular storage device storing the target data, and another to determine which device(s) are paired with that storage device. Combining the two queries into one is merely a simplification.)

Once the application knows, via the API, about which devices are paired, the application may then use that information accordingly. For example, assume that co-processors 130-1 and 130-2 of FIG. 1 were both FPGAs that offered data acceleration services. Once the application knows which storage device stores the target data, the application may direct a request to the FPGA paired with that storage device requesting the data acceleration service on the target data. The same principle applies to any other functionality that may be offered by co-processors 130-1 and 130-2 of FIG. 1: data acceleration is used only as an example functionality.

At this point, one question remains: how are the devices made aware of the information that identifies the devices in the pairing? If the information is assigned at the time of manufacture as a unique data that is shared by the paired devices, the answer is obvious. But if the devices use their serial numbers, or other data that is unique to each device individually, to help identify their pairings, then the answer is not so straightforward. FIGS. 7-9 illustrate how the devices may obtain this information.

Figure 7:
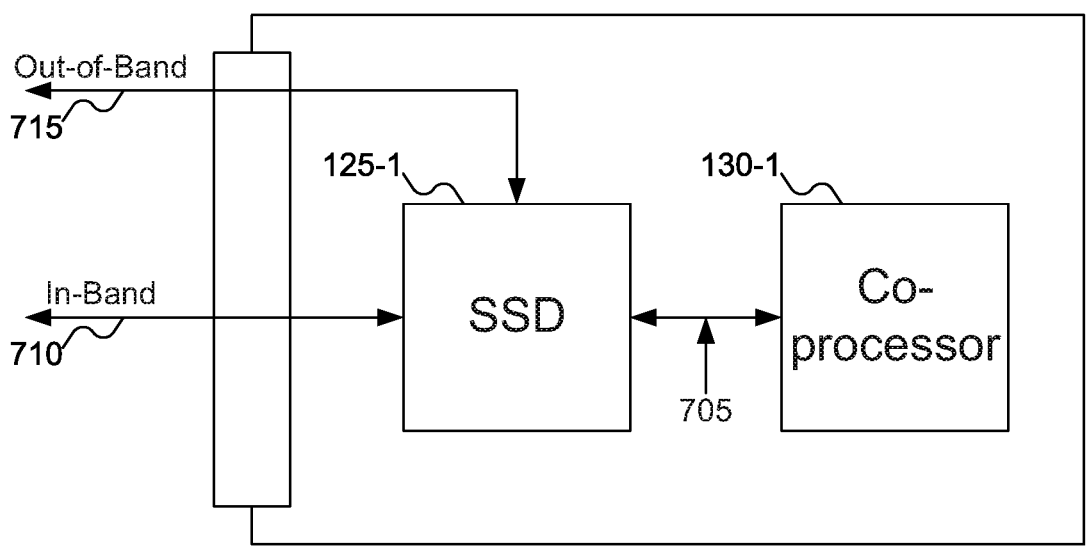
FIG. 7 shows an SSD of FIG. 1 and a co-processor of FIG. 1 in a single form factor, in an embodiment of the inventive concept.

FIG. 7 shows SSD 125-1 of FIG. 1 and co-processor 130-1 of FIG. 1 in a single form factor, in an embodiment of the inventive concept. In FIG. 7, SSD 125-1 and co-processor 130-1 may communicate using a hardware interface that connects the devices. For example, this hardware interface may be a System Management Bus (SMBus) connecting SSD 125-1 and co-processor 130-1. If an SMBus is used, either device—SSD 125-1 or co-processor 130-1—may be the master device and the other may be the slave device, or both may be master devices on a multi-master bus. For example, in some embodiments, SSD 125-1 may be the master of SMBus 705 and co-processor 130-1 may be the slave.

As shown, SSD 125-1 may be connected to machine 105 of FIG. 1 via both in-band connection 710 and out-of-band connection 715. In-band connection 710 may include, for example, messages sent over a PCI Express (PCIe) connection, whereas out-of-band connection 715 may be, for example, another SMBus connection (on which SSD 125-1 may be the slave and a Board Management Controller (BMC) may be the master, or on which both SSD 125 and the BMC may be master on a multi-master bus). Typically, in-band connection 710 may be used for conventional requests, such as read and write requests issued to SSD 125-1 and to use the functions of co-processor 130-1, whereas out-of-band connection 715 may be used for control-type requests: for example, a query for the current operating temperature of SSD 125-1 and/or co-processor 130-1. Where in-band connection 710 is used to communicate with co-processor 130-1, SSD 125-1 may act as a pass-through device, relying the message to co-processor 130-1. Alternatively, SSD 125-1 may act in some translator capacity, translating the request as received from machine 105 of FIG. 1 into a different form for transmission to co-processor 130-1.

Figure 8:
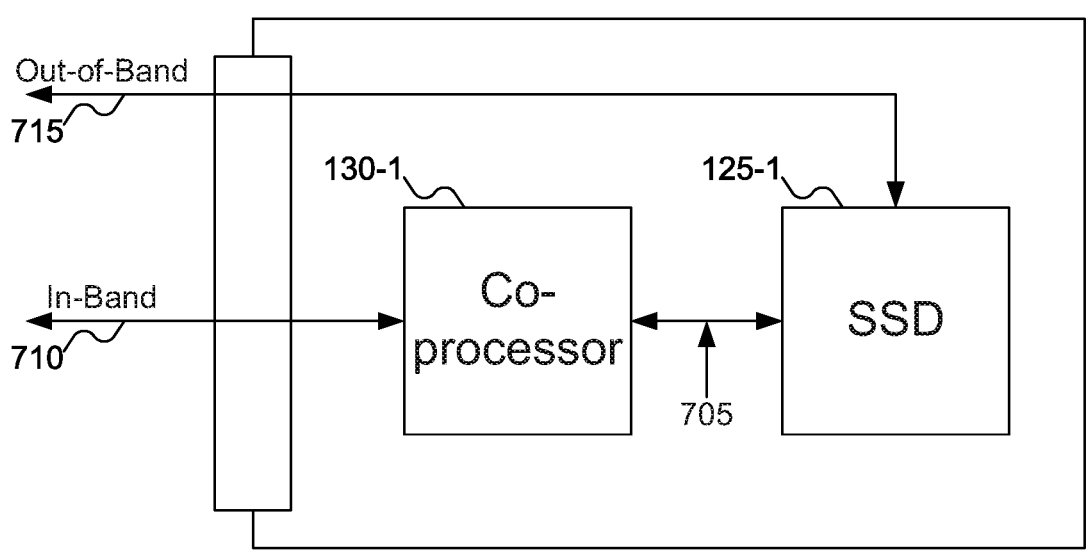
FIG. 8 shows an SSD of FIG. 1 and a co-processor of FIG. 1 in a single form factor, in another embodiment of the inventive concept.
Figure 9:
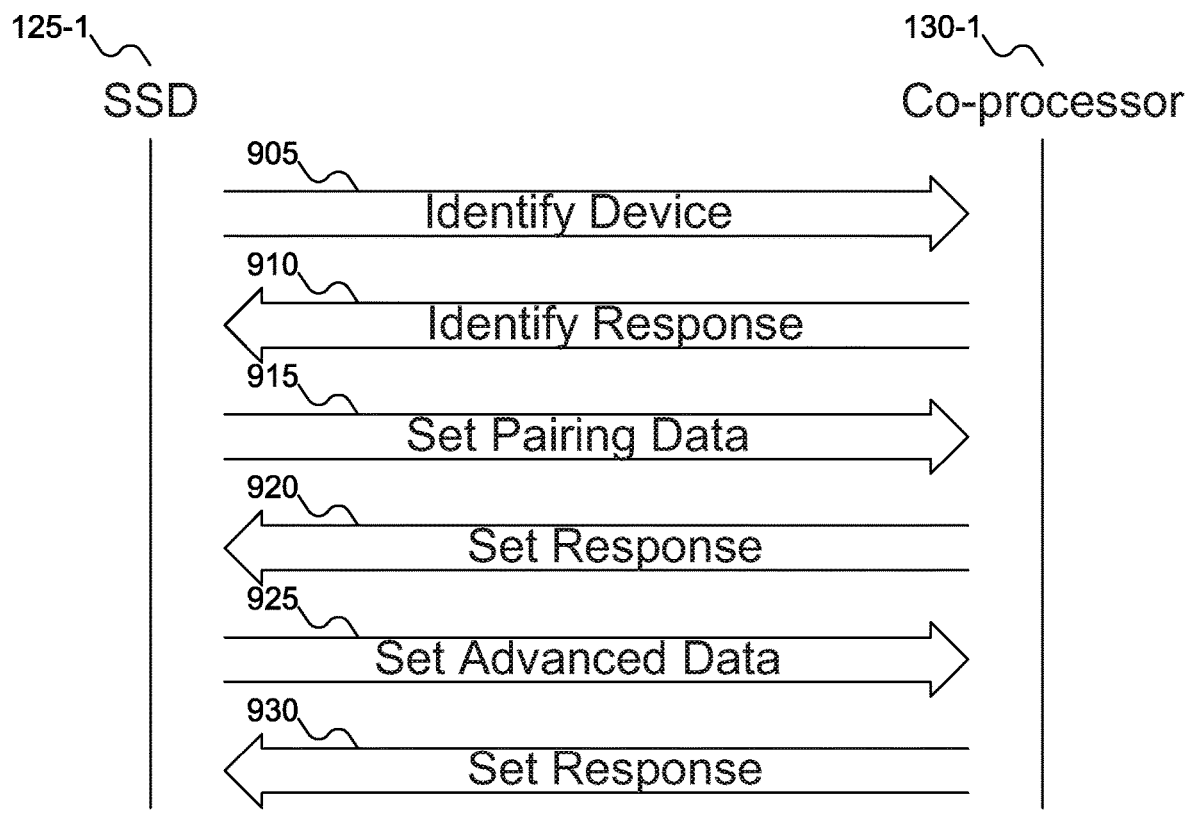
FIG. 9 shows the SSD of FIG. 1 and the co-processor of FIG. 1 establishing their pairings, according to an embodiment of the inventive concept.

In contrast with FIG. 7, FIG. 8 shows SSD 125-1 of FIG. 1 and co-processor 130-1 of FIG. 1 in a single form factor, in another embodiment of the inventive concept. In the embodiment shown in FIG. 8, co-processor 130-1 is directly connected to in-band connection 710, rather than SSD 125-1. In this embodiment of the inventive concept, when co-processor 130-1 receives a request intended for SSD 125-1, co-processor 130-1 may act as a pass-through device, relying the message to SSD 125-1. Alternatively, co-processor 130-1 may act in some translator capacity, translating the request as received from machine 105 of FIG. 1 into a different form for transmission to SSD 125-1. In all other respects, SSD 125-1 and co-processor 130-1 operate similarly to SSD 125-1 and co-processor 130-1 as in FIG. 7.

While FIGS. 7-8 address the possibility that SSD 125-1 and co-processor 130-1 are both sold in the same form factor, SSD 125-1 and co-processor 130-1 may be sold as separate components provided that there is some form of hardware interface 705 that permits communication between the two paired devices, to enable the devices sharing pairing information with operating system 325 of FIG. 4.

FIG. 9 shows SSD 125-1 of FIG. 1 and co-processor 130-1 of FIG. 1 establishing their pairings, according to an embodiment of the inventive concept. FIG. 9 may be used when SSD 125-1 and co-processor 130-1 share a hardware interface, such as hardware interface 705 of FIGS. 7-8. In FIG. 9, SSD 125-1 is initiating the inquiry for device information from co-processor 125-1. SSD 125-1 may send Identify Device 905 to co-processor 130-1 (this command, and all other commands in FIGS. 9-10, may be NVMe commands, or may be commands using other protocols). Co-processor 130-1 may respond with Identify Response 910, which may include the unique information relating to the pairing of SSD 125-1 and co-processor 130-1. This information may include, for example, a GUID or the manufacturer's model number and serial number of co-processor 130-1. Upon receiving Identify Response 910, SSD 125-1 may store the information of co-processor 130-1: for example, in storage 505-2 of FIG. 5. SSD 125-1 may then send Set Pairing Data 915, which may include the unique information of SSD 125-1: again, for example, a GUID or the manufacturer's model number and serial number of SSD 125-1. Co-processor 130-1 may then store the information of SSD 125-1: again, for example, in storage 515-1 of FIG. 5. Co-processor 130-1 may then send Set Response 920 to inform SSD 125-1 that the pairing data in the Set Pairing Data command was received. Finally, SSD 125-1 may send Set Advanced Data 925 to inform co-processor 130-1 of any other data SSD 125-1 wants co-processor 130-1 to know, which co-processor 130-1 may acknowledge with Set Response 930.

Figure 10:
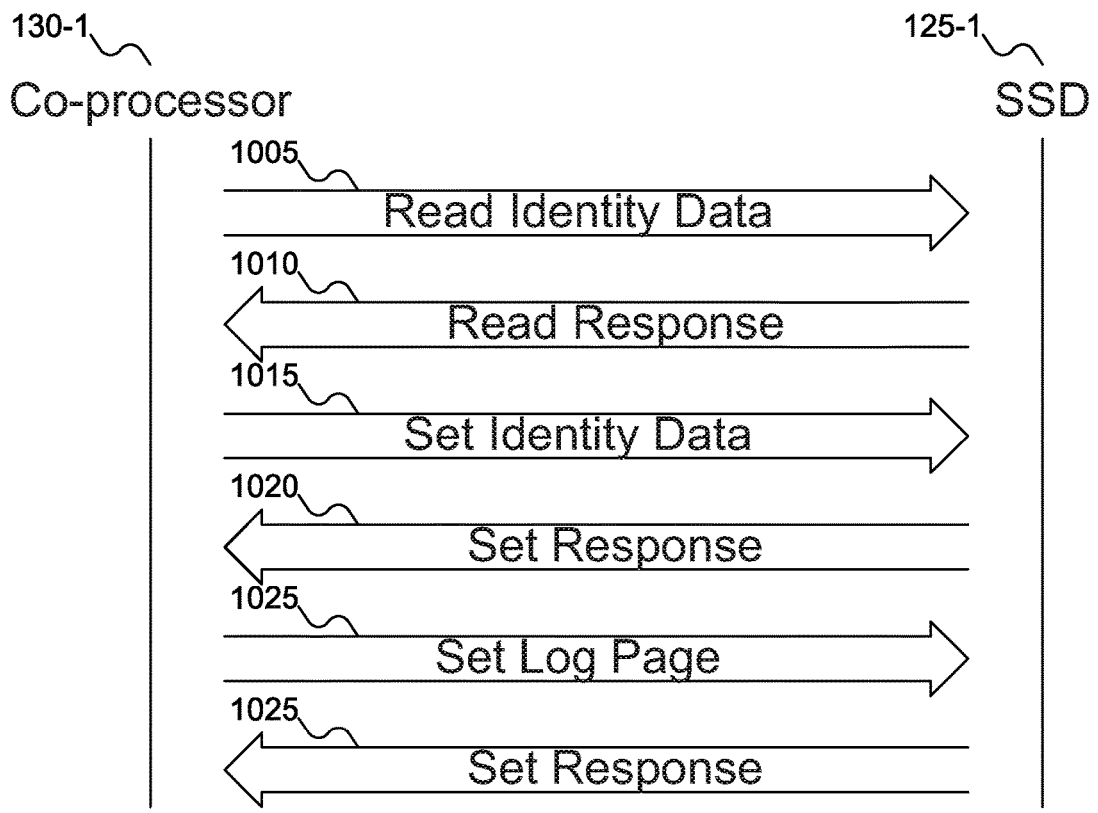
FIG. 10 shows the SSD of FIG. 1 and the co-processor of FIG. 1 establishing their pairings, according to another embodiment of the inventive concept.

FIG. 10 shows the SSD 125-1 of FIG. 1 and co-processor 130-1 of FIG. 1 establishing their pairings, according to another embodiment of the inventive concept. FIG. 9 is similar to FIG. 9, except that co-processor 130-1 may initiate the exchange of information rather than SSD 125-1. In FIG. 10, co-processor 130-1 may send Read Identity Data 1005 to SSD 125-1. SSD 125-1 may respond with Read Response 1010, which may include the unique information relating to the pairing of co-processor 130-1 and SSD 125-1. This information may include, for example, a GUID or the manufacturer's model number and serial number of SSD 125-1. Upon receiving Read Response 1010, co-processor 130-1 may store the information of SSD 125-1: for example, in storage 505-2 of FIG. 5. Co-processor 130-1 may then send Set Identity Data 1015, which may include the unique information of co-processor 130-1: again, for example, a GUID or the manufacturer's model number and serial number of co-processor 130-1. SSD 125-1 may then store the information of co-processor 130-1: again, for example, in storage 515-1 of FIG. 5. SSD 125-1 may then send Set Response 1020 to inform co-processor 130-1 that the pairing data in the Set Identity Data command was received. Finally, co-processor 130-1 may send Set Log Page 925 to inform SSD 125-1 of any other data co-processor 130-1 wants SSD 125-1 to know, which SSD 125-1 may acknowledge with Set Response 1025.

FIG. 11 shows a first topology including SSD 125-1 of FIG. 1 and co-processor 130-1 of FIG. 1, according to one embodiment of the inventive concept. FIGS. 11-14 are taken from co-pending U.S. patent application Ser. No. 16/260, 087, filed Jan. 28, 2019, which is a continuation-in-part of U.S. patent application Ser. No. 16/226,629, filed Dec. 19, 2018, which is a continuation of U.S. patent application Ser. No. 16/207,080, filed Nov. 30, 2018, which claims the benefit of U.S. Provisional Patent Application Ser. No. 62/745,261, filed Oct. 12, 2018, all of which are incorporated by reference herein for all purposes. But whereas co-pending U.S. patent application Ser. No. 16/260,087 was concerned with the overall combination of a PCIe switch with Erasure Coding, this document is more concerned with the structure of the SSD and its co-processor(s).

In FIG. 11, PCIe switch with Look-Aside Erasure Coding logic 1105 is shown, which may be implemented as a separate component of machine 105 of FIG. 1. That is, PCIe switch with Look-Aside Erasure Coding logic 1105 may be manufactured and sold separately from any other components, such as processor 110 of FIG. 1, storage device 125-1, or co-processor 130-1.

PCIe switch with Look-Aside Erasure Coding logic 1105 may be connected to storage device 125-1. In FIG. 11, PCIe switch with Look-Aside Erasure Coding logic 1105 is shown connected to only a single storage device, which may not support Erasure Coding: Erasure Coding requires at least two storage devices or at least two portions of a storage device to perform striping, chunking, grouping, and using parity or code information. But even with a single storage device PCIe switch with Look-Aside Erasure Coding logic 1105 may offer some advantages. For example, PCIe switch with Look-Aside Erasure Coding logic 1105 may support using Error Correcting Codes with storage device 125-1, or encrypting the data stored on storage device 125-1 if those services are not offered natively by storage device 125-1.

Storage device 125-1 may also be connected to FPGA 205, an example of co-processor 130-1 of FIG. 1 (for the remainder of the discussion regarding FIGS. 11-14, any reference to FPGA 205 may be understood to include a reference to any alternative co-processor as shown in FIG. 2, or more generally to co-processor 130-1 of FIG. 1). FPGA 205 may support acceleration. In short, there may be situations where data may need to be processed and then discarded. To load all that data into processor 110 of FIG. 1 to perform the processing may be expensive and time-consuming: the computations may be more easily performed closer to the data. FPGA 205 may support performing such calculations closer to the storage, avoiding the need for the data to be loaded into processor 110 of FIG. 1 to perform the computations: this concept is termed "acceleration". FPGA-based acceleration is discussed more in U.S. patent application Ser. No. 16/122,865, filed Sep. 5, 2018, which claims the benefit of U.S. Provisional Patent Application Ser. No. 62/642,568, filed Mar. 13, 2018, U.S. Provisional Patent Application Ser. No. 62/641,267, filed Mar. 13, 2018, and U.S. Provisional Patent Application Ser. No. 62/638,904, filed Mar. 5, 2018, all of which are hereby incorporated by reference, as well as U.S. patent application Ser. No. 16/124, 179, filed Sep. 6, 2018, U.S. patent application Ser. No. 16/124,182, filed Sep. 6, 2018, and U.S. patent application Ser. No. 16/124,183, filed Sep. 6, 2018, all of which are continuations of U.S. patent application Ser. No. 16/122,865, filed Sep. 5, 2018 and are hereby incorporated by reference. Because the objective in acceleration is to handle the data without transferring the data to processor 110 of FIG. 1, FIG. 11 shows FPGA 205 closer to storage device 125-1. Note, however, that the particular arrangement shown in FIG. 11 is not required: FPGA 205 might be located between PCIe switch with Look-Aside Erasure Coding logic 1105 and storage device 125-1.

Aside from data acceleration, FPGA 205 may offer other functionalities to support storage device 125-1. For example, FPGA 205 may implement data deduplication functions on storage device 125-1, to attempt to reduce the number of times the same data is stored on storage device 125-1. FPGA 205 may determine whether a particular datum is stored more than once on storage device 125-1, establish associations between the various Logical Block Addresses (or other information used by the host to identify the datum) and where the datum is stored on storage device 125-1, and delete the additional copies.

Alternatively, FPGA 205 may implement data integrity functions on storage device 125-1, such as adding Error Correcting Codes, to protect against data loss through errors in the operation of storage device 125-1, or T10DIF (Data Integrity Field) using Cyclic Redundancy Correction (CRC) for end-to-end protection. In this manner, FPGA 205 may be able to detect when there is an error writing or reading the datum on storage device 125-1 or for data in transit and recover the original data. Note that FPGA 205 may implement data integrity functionality without the host being aware that data integrity functionality is being provided: the host may only see the datum itself and not any of the Error Correcting Codes.

Alternatively, FPGA 205 may implement data encryption functions on storage device 125-1, to protect against unauthorized parties being able to access data on storage device 125-1: without the appropriate encryption key being provided, the data returned from FPGA 205 may be meaningless to the requestor. The host may provide the encryption key to be used when writing and reading the data. Or, FPGA 205 may perform data encryption and decryption automatically: FPGA 205 may store the encryption keys (and may even generate them on behalf of the host), and determine the appropriate encryption key to use based on who is requesting the data.

Alternatively, FPGA 205 may implement data compression functions on storage device 125-1, to reduce the amount of space required to store data on storage device 125-1. When writing data to storage device 125-1, FPGA 205 may implement a function that compresses the data provided by the host into a smaller amount of storage, then stores the compressed data (along with any information needed to recover the original data when reading the data from storage device 125-1). When reading data from storage device 125-1, FPGA 205 may read the compressed data (along with any information needed to recover the original data from the compressed data) and remove the compression to recover the original data.

Any desired implementations of data deduplication, data integrity, data encryption, and data compression may be used. Embodiments of the inventive concept are not limited to a particular implementation of any of these functions.

FPGA 205 may also implement any combination of functions on storage device 125-1 as desired. For example, FPGA 205 may implement both data compression and data integrity (since data compression may increase the sensitivity of data to errors: a single error in the data as stored on storage device 125-1 may result in large amounts of data being unusable). Or FPGA 205 may implement both data encryption and data compression (to protect the data while using as little storage for the data as possible). Other combinations of two or more functions may also be offered by FPGA 205.

In terms of overall operation, when implementing any of these functionalities, FPGA 205 may read the data from an appropriate source. Note that while the term "source" is a singular noun, embodiments of the inventive concept may read data from multiple sources (such as multiple storage devices), if appropriate. FPGA 205 may then perform the appropriate operations on the data: data acceleration, data integration, data encryption, and/or data compression. FPGA 205 may then take an appropriate action with the results of the operation: for example, sending the results to machine 105 of FIG. 1, or writing the data to storage device 125-1.

While the functionalities above are described with reference to FPGA 205 of FIG. 11, embodiments of the inventive concept may include these functionalities anywhere in the system that includes an FPGA. Further, embodiments of the inventive concept may have the FPGA 205 access data from a "distant" storage device. For example, return momentarily to FIG. 1, and assume that storage device 125-1 includes an FPGA similar to FPGA 205, but storage device 125-2 lacks such a co-processor. The FPGA included in storage device 125-1 may be used to apply its functionalities to storage device 125-2 by sending requests to storage device 125-2. For example, if the FPGA in storage device 125-1 offers data acceleration, the FPGA in storage device 125-1 may send requests to read data from storage device 125-2, perform the appropriate acceleration, then send the results to an appropriate destination (such as machine 105 of FIG. 1).

In FIG. 11 (and in the topologies shown in FIGS. 12-14 below), PCIe switch with Look-Aside Erasure Coding logic 1105 may be attached to devices that do not qualify for Erasure Coding. For example, PCIe switch with Look-Aside Erasure Coding logic 1105 may be attached to other storage devices that have built-in Erasure Coding functionality, or devices that are not storage devices, such as FPGA 205 of FIG. 11 or GPU 215 of FIG. 2. All such devices may be described as devices that do not qualify for Erasure Coding (or at least, for Erasure Coding by PCIe switch with Look-Aside Erasure Coding logic 1105).

Figure 13:
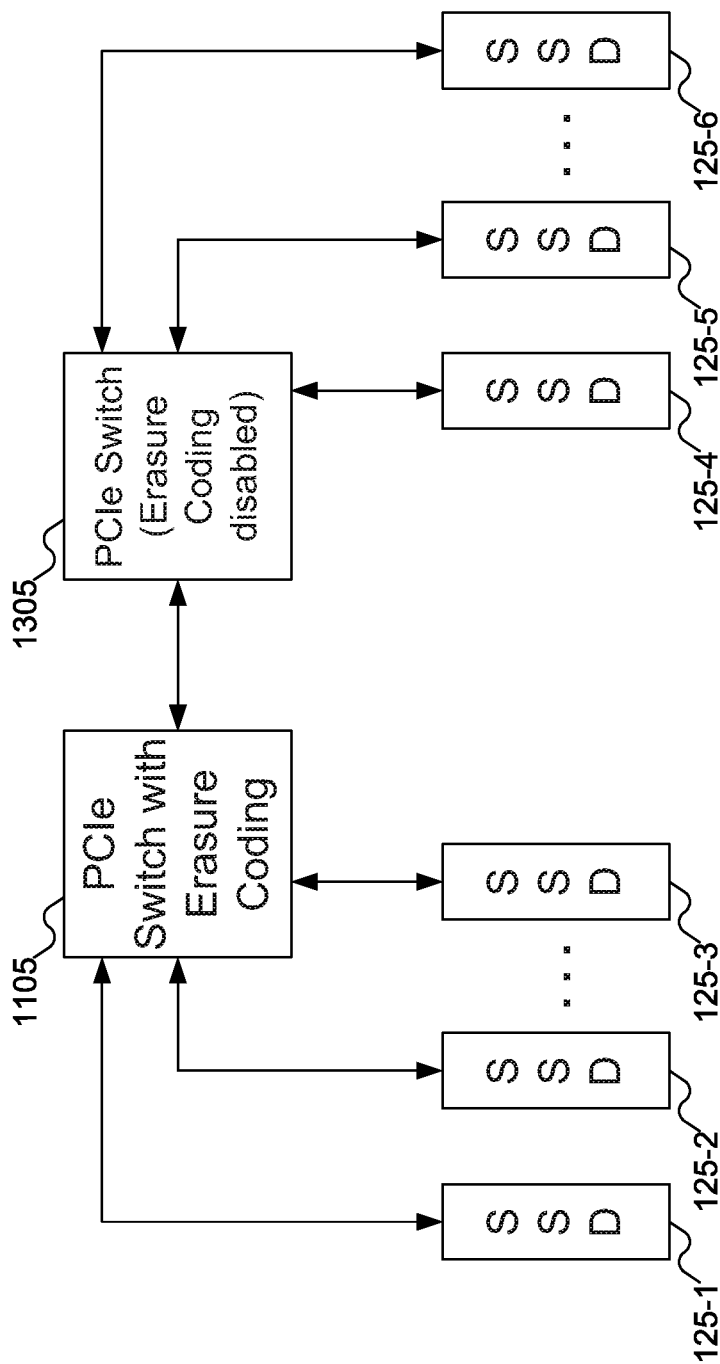
FIG. 13 shows a third topology including the SSD of FIG. 1 and the co-processor of FIG. 1, according to yet another embodiment of the inventive concept.

When PCIe switch with Look-Aside Erasure Coding logic 1105 is connected to devices that do not qualify for Erasure Coding, the system has various alternative approaches that may be used. In one embodiment of the inventive concept, the inclusion of any devices that do not qualify for Erasure Coding may result in the Look-Aside Erasure Coding logic of PCIe switch with Look-Aside Erasure Coding logic 1105 being disabled. Thus, if, for example, PCIe switch with Look-Aside Erasure Coding logic 1105 were connected to FPGA 205 of FIG. 11, or GPU 215 of FIG. 2, or a storage device with native Erasure Coding logic, then none of the storage devices connected to PCIe switch with Look-Aside Erasure Coding logic 1105 may be used with Erasure Coding. Note that the decision to disable the Look-Aside Erasure Coding logic of PCIe switch with Look-Aside Erasure Coding logic 1105 does not necessarily translate to other PCIe switches with Look-Aside Erasure Coding logic in the same or other chassis. For example, looking ahead momentarily to FIG. 13, FIG. 13 shows two PCIe switches with Look-Aside Erasure Coding logic 1105 and 1305, one of which may have the Look-Aside Erasure Coding logic enabled and the other may have the Look-Aside Erasure Coding logic disabled.

Another embodiment of the inventive concept may disable the devices that do not qualify for Erasure Coding, treating them as though they were not connected to PCIe switch with Look-Aside Erasure Coding logic 1105 at all. In this embodiment of the inventive concept, PCIe switch with Look-Aside Erasure Coding logic 1105 may enable the Look-Aside Erasure Coding logic for storage device 125-1 and any other storage devices that qualify for Erasure Coding may be disabled, as though they were not connected to PCIe switch with Look-Aside Erasure Coding logic 1105.

In yet another embodiment of the inventive concept, PCIe switch with Look-Aside Erasure Coding logic 1105 may enable the Look-Aside Erasure Coding logic for storage devices that may be covered by the Look-Aside Erasure Coding logic, but still enable other devices that do not qualify for Erasure Coding to be accessed. This embodiment of the inventive concept is the most complicated implementation: PCIe switch with Look-Aside Erasure Coding logic 1105 needs to determine which devices qualify for Erasure Coding and which do not, then analyze traffic to determine whether the traffic is destined for the virtual storage device (in which case the traffic is intercepted by the Look-Aside Erasure Coding logic) or not (in which case the traffic is delivered to its original destination).

In embodiments of the inventive concept where machine 105 of FIG. 1 ends up not offering the full functionality of the installed devices-namely, the embodiments of the inventive concept where Erasure Coding is disabled due to the presence of devices that do not qualify for Erasure Coding, or such devices are disabled by PCIe switch with Look-Aside Erasure Coding logic 1105—machine 105 of FIG. 1 may notify a user of this fact. This notification may be provided by processor 110 of FIG. 1, a BMC, or PCIe switch with Look-Aside Erasure Coding logic 1105. Aside from informing the user that some functionality has been disabled, the notification may also inform the user how to reconfigure machine 105 of FIG. 1 to permit added functionality. For example, the notification may suggest that devices that do not qualify for Erasure Coding be connected to particular slots in a mid-plane—perhaps those slots connected to PCIe switch with Look-Aside Erasure Coding logic 1305—and storage devices that do qualify for Erasure Coding be connected to other slots, such as those connected to PCIe switch with Look-Aside Erasure Coding logic 1105. In this manner, at least some storage devices that qualify for Erasure Coding may benefit from the Erasure Coding scheme, without blocking access to other devices that do not qualify for Erasure Coding.

FIG. 12 shows a second topology including the SSD of FIG. 1 and the co-processor of FIG. 1, according to another embodiment of the inventive concept. In FIG. 12, PCIe switch with Look-Aside Erasure Coding logic 1105 may be located within FPGA 205: that is, FPGA 205 may also implement PCIe switch with Look-Aside Erasure Coding logic 1105. FPGA 205 and PCIe switch with Look-Aside Erasure Coding logic 1105 may then be connected to storage devices 125-1 through 125-4. While FIG. 12 shows FPGA 205 and PCIe switch with Look-Aside Erasure Coding logic 1105 connected to four storage devices 125-1 through 125-4, embodiments of the inventive concept may include any number of storage devices 125-1 through 125-4.

Typically, the topology shown in FIG. 12 may be implemented within a single shell or housing, containing all of the components shown (SSDs 125-1 through 125-4 may be separate flash memories, rather than self-contained SSDs). That is, rather than being sold as separate components, the entire structure shown in FIG. 12 may be sold as a single unit. But embodiments of the inventive concept may also include a riser card connecting to machine 105 of FIG. 1 (perhaps to a mid-plane) on one end and with connectors, such as U.2, M.3, or SFF-TA-1008 connectors on the other end to connect to storage devices 125-1 through 125-4. And while FIG. 12 shows PCIe switch with Look-Aside Erasure Coding logic 1105 as part of FPGA 205, PCIe switch with Look-Aside Erasure Coding logic 1105 may also be implemented as part of a Smart SSD.

FIG. 13 shows a third topology for using PCIe switch with Look-Aside Erasure Coding logic 1105 of FIG. 1, according to yet another embodiment of the inventive concept. In FIG. 13, two PCIe switches with Look-Aside Erasure Coding logic 1105 and 1305 are shown, between them connecting up to 24 storage devices 125-1 through 125-6. Each PCIe switch with Look-Aside Erasure Coding logic 1105 and 1305 may include 96 PCIe lanes, with four PCIe lanes used in each direction to communicate with one of storage devices 125-1 through 125-6: each PCIe switch with Look-Aside Erasure Coding logic 1105 and 1305 may then support up to 12 storage devices. To support Erasure Coding across storage devices supported by multiple PCIe switches with Look-Aside Erasure Coding logic 1105 and 1305, one PCIe switch with Look-Aside Erasure Coding logic may be designated to be responsible for the Erasure Coding across all the devices, and may have the Look-Aside Erasure Coding logic enabled. The other PCIe switch with Look-Aside Erasure Coding logic 1305 may operate purely as a PCIe switch, with the Look-Aside Erasure Coding logic disabled. The choice as to which PCIe switch should be selected to handle Erasure Coding may be done in any desired manner: for example, the two PCIe switches may negotiate this between themselves, or the PCIe switch that is enumerated first may be designated to handle Erasure Coding. The PCIe switch selected to handle Erasure Coding may then report the virtual storage device (spanning both PCIe switches), whereas the PCIe switch that does not handle Erasure Coding may report no downstream devices (to prevent processor 110 of FIG. 1 from attempting to access storage devices that are part of the Erasure Coding scheme).

Note that while PCIe switches with Look-Aside Erasure Coding logic 1105 and 1305 may both be in the same chassis, PCIe switches with Look-Aside Erasure Coding logic 1105 and 1305 may be in different chassis. That is, the Erasure Coding scheme may span storage devices across multiple chassis. All that is required is that the PCIe switches in the various chassis be able to negotiate with each other where the storage devices that are to be part of the Erasure Coding scheme are located. Nor are embodiments of the inventive concept limited to two PCIe switches with Look-Aside Erasure Coding logic 1105 and 1305: the storage devices included in the Erasure Coding scheme may be connected to any number of PCIe switches with Look-Aside Erasure Coding logic 1105 and 1305.

Host Logical Block Addresses (LBAs) may be split across PCIe switches with Look-Aside Erasure Coding logic 1105 and 1305 in any desired manner. For example, the least significant bit in the host LBA may be used to identify which PCIe switch with Look-Aside Erasure Coding logic 1105 or 1305 includes the storage device storing the data with that host LBA. With more than two PCIe switches with Look-Aside Erasure Coding logic, multiple bits may be used to determine which PCIe switch with Look-Aside Erasure Coding logic manages the storage device storing the data. Once the appropriate PCIe switch with Look-Aside Erasure Coding logic has been identified, the transmission may be routed to the appropriate PCIe switch with Look-Aside Erasure Coding logic (assuming that the transmission is not destined for a storage device connected to the PCIe switch with Look-Aside Erasure Coding logic with the Look-Aside Erasure Coding logic enabled).

In another embodiment of the inventive concept, rather than having a single PCIe switch with Look-Aside Erasure Coding logic be responsible for virtualizing all storage devices connected to both PCIe switches with Look-Aside Erasure Coding logic, each PCIe switch with Look-Aside Erasure Coding logic may create a separate virtual storage device (with a separate Erasure Coding domain). In this manner, different Erasure Coding domains may be created for different customers, but with smaller capacities.

Although FIG. 13 implies that only storage devices 125-1 through 125-6 are connected to PCIe switches with Look-Aside Erasure Coding logic 1105 and 1305, and that all storage devices 125-1 through 125-6 may be used with the Erasure Coding scheme, as discussed above embodiments of the inventive concept are not so limited: PCIe switches with Look-Aside Erasure Coding logic 1105 and 1305 may have devices that do not qualify for Erasure Coding connected to them. Such devices may be grouped under a single PCIe switch with Look-Aside Erasure Coding logic, with storage devices that qualify for Erasure Coding grouped under a different PCIe switch with Look-Aside Erasure Coding logic 1105. In this manner, the optimal functionality of machine 105 of FIG. 1 may be achieved, with one (or some) PCIe switch with Look-Aside Erasure Coding logic enabling the Look-Aside Erasure Coding logic and one (or some) PCIe switch with Look-Aside Erasure Coding logic disabling the Look-Aside Erasure Coding logic.

Figure 14:
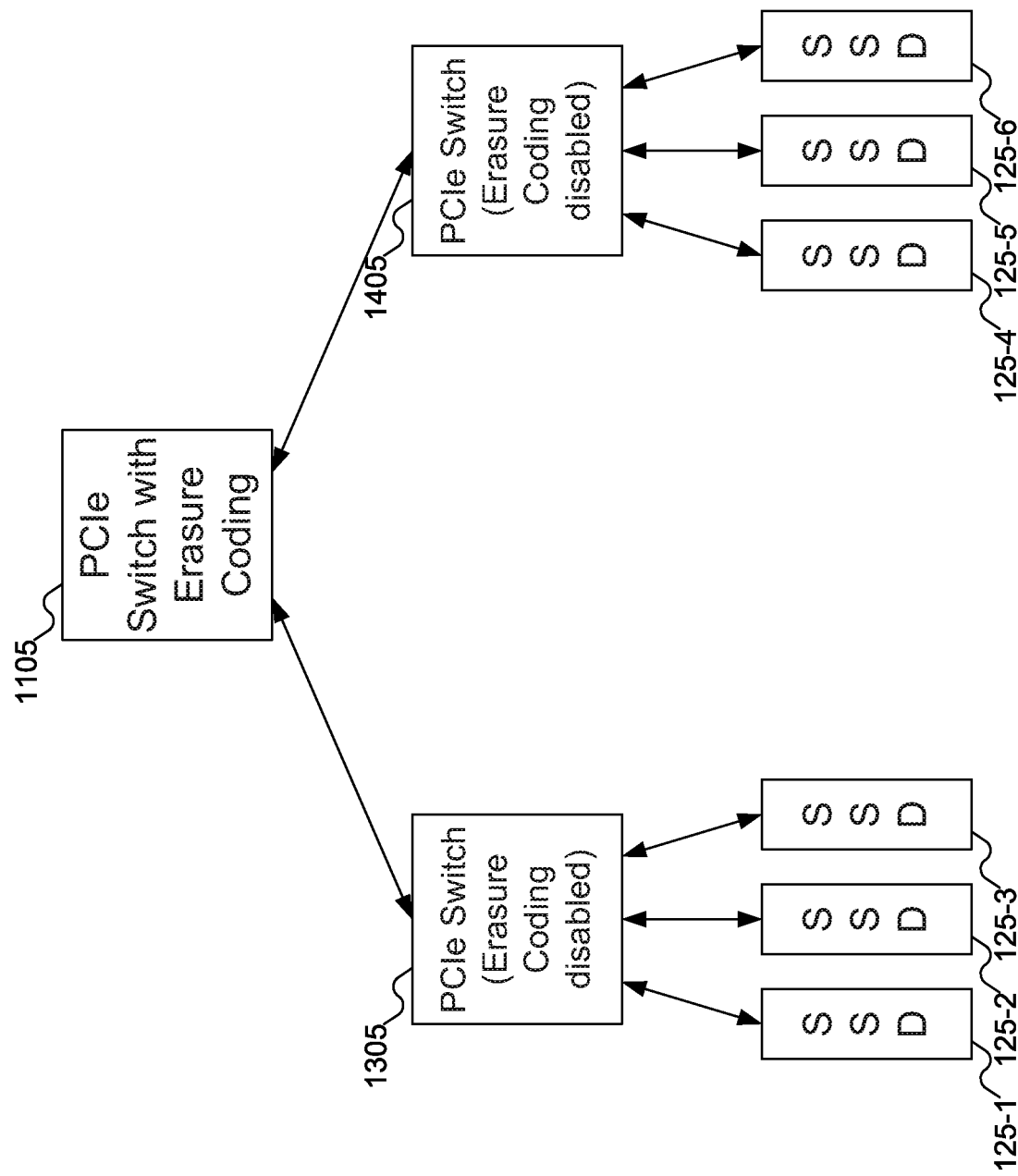
FIG. 14 shows a fourth topology including the SSD of FIG. 1 and the co-processor of FIG. 1, according to yet another embodiment of the inventive concept.

FIG. 14 shows a fourth topology including the SSD of FIG. 1 and the co-processor of FIG. 1, according to yet another embodiment of the inventive concept. In FIG. 14, as compared with FIG. 13, PCIe switches with Look-Aside Erasure Coding logic 1105, 1305, and 1405 may be structured in a hierarchy. PCIe switch with Look-Aside Erasure Coding logic 1105, at the top of the hierarchy, may manage Erasure Coding for all storage devices beneath PCIe switch with Look-Aside Erasure Coding logic 1105 in the hierarchy, and so may have the Look-Aside Erasure Coding logic enabled. PCIe switches with Look-Aside Erasure Coding logic 1305 and 1405, on the other hand, may have their Look-Aside Erasure Coding logics disabled (since their storage devices are managed by the Look-Aside Erasure Coding logic of PCIe switch with Look-Aside Erasure Coding logic 1105).

While FIG. 14 shows three PCIe switches with Look-Aside Erasure Coding logic 1105, 1305, and 1405 structured in a two-tier hierarchy, embodiments of the inventive concept are not limited in the number of PCIe switches included or in their hierarchical arrangement. Embodiments of the inventive concept may therefore support any number of PCIe switches with Look-Aside Erasure Coding logic, arranged in any desired hierarchy.

The embodiments of the inventive concept described above with reference to FIGS. 1-14 focus on single-port storage devices. But embodiments of the inventive concept may extend to dual-port storage devices, where one (or more) storage devices communicates with multiple PCIe switches with Look-Aside Erasure Coding logic. In such embodiments of the inventive concept, if PCIe switch with Look-Aside Erasure Coding logic 1105 of FIG. 11 is unable communicate with the dual-port storage device, PCIe switch with Look-Aside Erasure Coding logic 1105 may send a transmission to PCIe switch with Look-Aside Erasure Coding logic 1305 to attempt to communicate with the storage device. PCIe switch with Look-Aside Erasure Coding logic 1305 effectively acts as a bridge to let PCIe switch with Look-Aside Erasure Coding logic 1105 communicate with the storage device.

Figure 15:
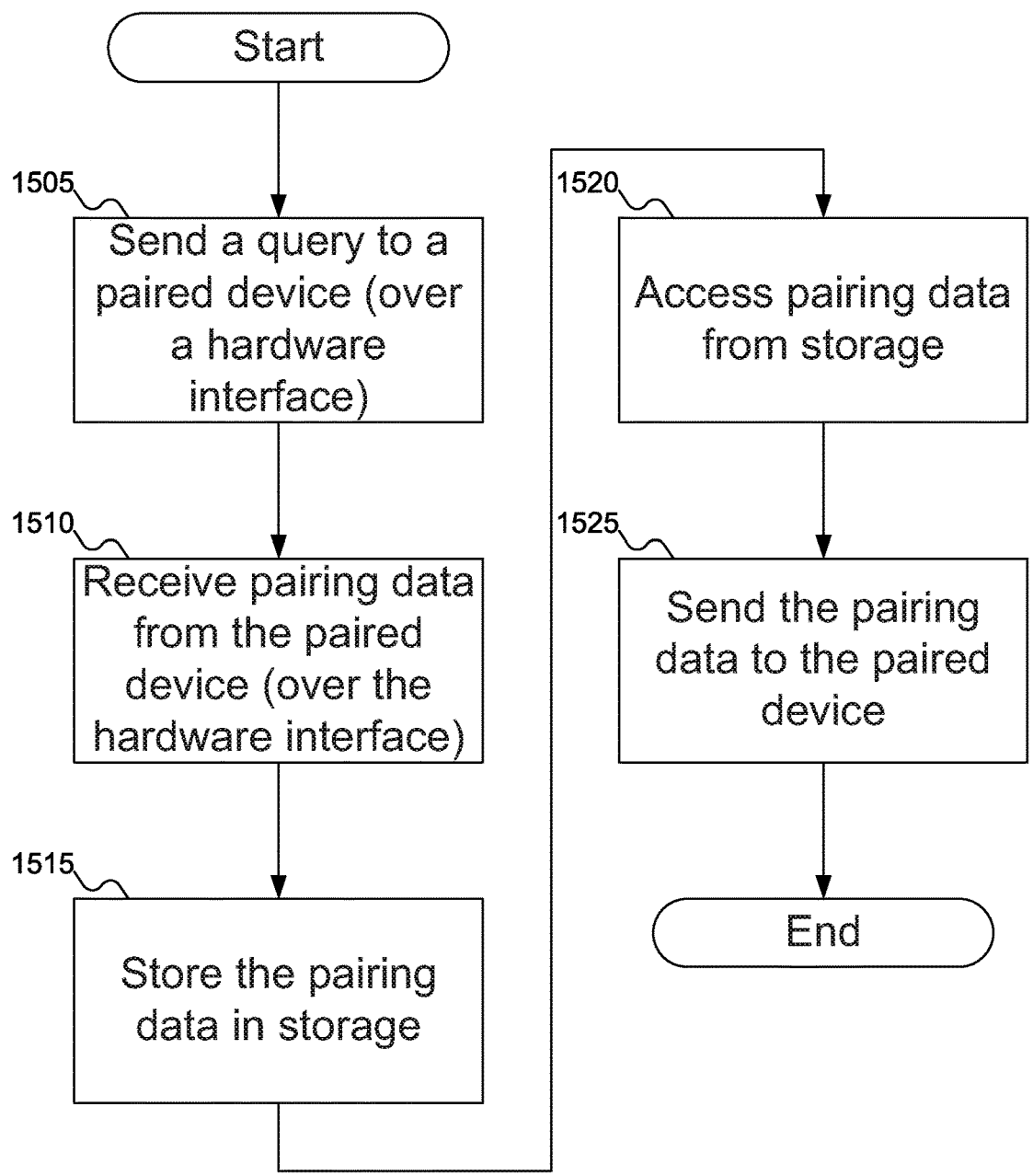
FIG. 15 shows a flowchart of an example procedure for the SSD of FIG. 1 (or the co-processor of FIG. 1) to query its partner for pairing data, according to an embodiment of the inventive concept.

FIG. 15 shows a flowchart of an example procedure for SSD 125-1 of FIG. 1 (or co-processor 130-1 of FIG. 1) to query its partner for pairing data, according to an embodiment of the inventive concept. In FIG. 15, at block 1505, SSD 125-1 of FIG. 1 may send Identify Device 905 of FIG. 9 (or co-processor 130-1 of FIG. 1 may send Read Identity Data 1005 of FIG. 10) to its partner. At block 1510, SSD 125-1 of FIG. 1 may receive Identify Response 910 of FIG. 9 (or co-processor 130-1 of FIG. 1 may receive Read Response 1010 of FIG. 10). At block 1515, SSD. 125-1 of FIG. 1 may store the received pairing information in storage 505-2 of FIG. 5 (or co-processor 130-1 of FIG. 1 may store the received pairing information in storage 515-1 of FIG. 5). At block 1520, SSD 125-1 of FIG. 1 may access its own pairing information from storage 505-1 of FIG. 5 (or co-processor 130-1 of FIG. 1 may access its pairing information from storage 515-2 of FIG. 5). Finally, at block 1525, SSD 125-1 of FIG. 1 may send Set Pairing Data 915 of FIG. 9 (or co-processor 130-1 of FIG. 1 may send Set Identity Data 1015 of FIG. 10) to its partner, so that its partner may store its pairing information.

Figure 16:
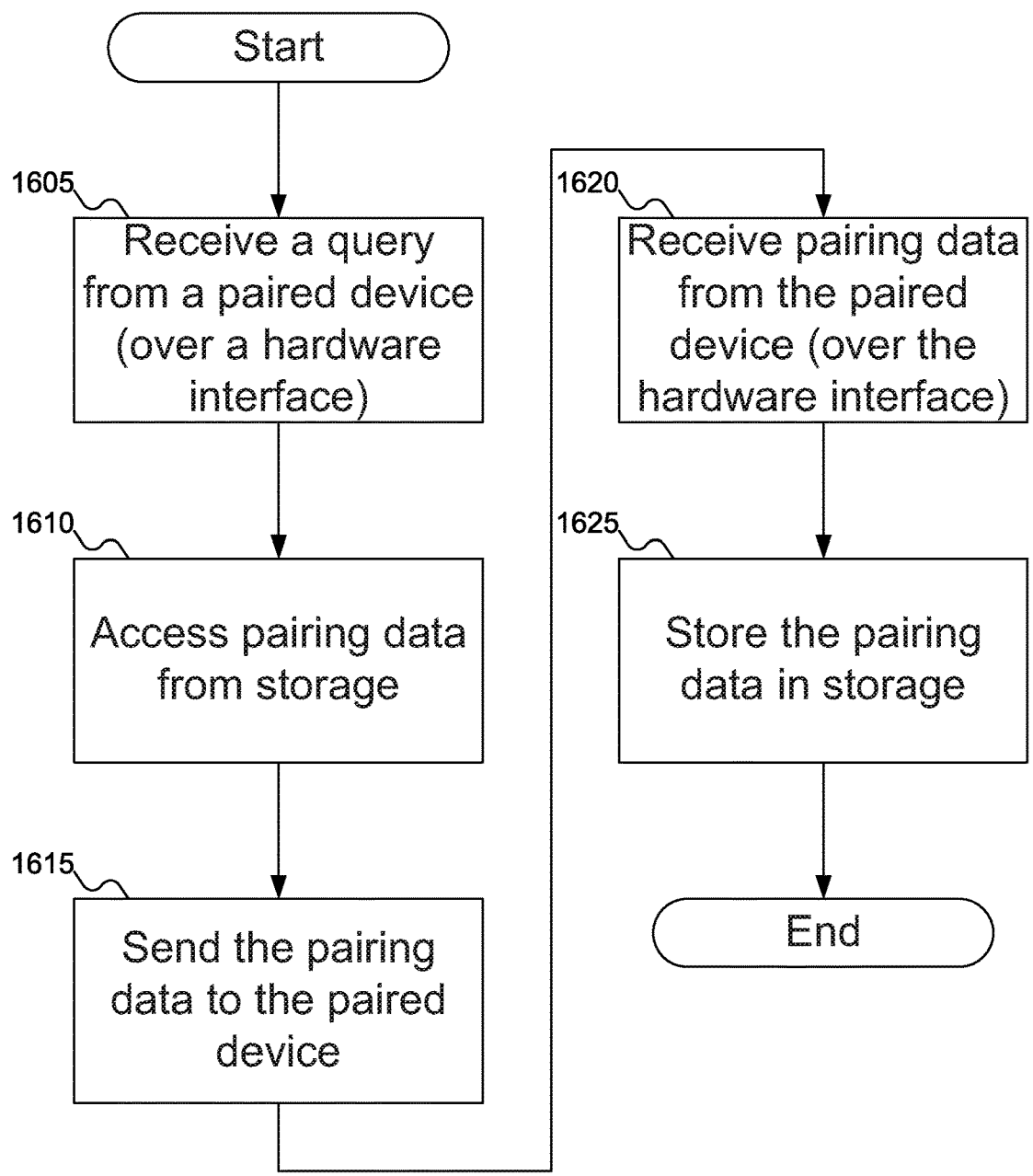
FIG. 16 shows a flowchart of an example procedure for the SSD of FIG. 1 (or the co-processor of FIG. 1) to receive from its partner a query for pairing data, according to an embodiment of the inventive concept.

FIG. 16 shows a flowchart of an example procedure for SSD 125-1 of FIG. 1 (or co-processor 130-1 of FIG. 1) to receive from its partner a query for pairing data, according to an embodiment of the inventive concept. In FIG. 12, at block 1605, SSD 125-1 of FIG. 1 may receive Read Identity Data 1005 of FIG. 10 from co-processor 130-1 of FIG. 1 (or co-processor 130-1 of FIG. 1 may receive Identify Device 905 of FIG. 9 from SSD 125-1 of FIG. 1). At block 1610, SSD 125-1 of FIG. 1 may access its pairing information from storage 505-1 of FIG. 5 (or co-processor 130-1 may access its pairing information from storage 515-2 of FIG. 5). At block 1615, SSD 125-1 of FIG. 1 may send the pairing information in Read Response 1010 of FIG. 10 to co-processor 130-1 of FIG. 1 (or co-processor 130-1 of FIG. 1 may send the pairing information in Identify Response 910 of FIG. 9). At block 1620, SSD 125-1 of FIG. 1 may receive Set Identity Data 1015 of FIG. 10 from co-processor 130-1 of FIG. 1 (or co-processor 130-1 of FIG. 1 may receive Set Pairing Data 915 of FIG. 9 from SSD 125-1 of FIG. 1). Finally, at block 1625, SSD 125-1 of FIG. 1 may store the pairing information of co-processor 130-1 of FIG. 1 in storage 505-2 of FIG. 5 (or co-processor 130-1 of FIG. 1 may store the pairing information of SSD 125-1 of FIG. 1 in storage 515-1 of FIG. 5).

Figure 17:
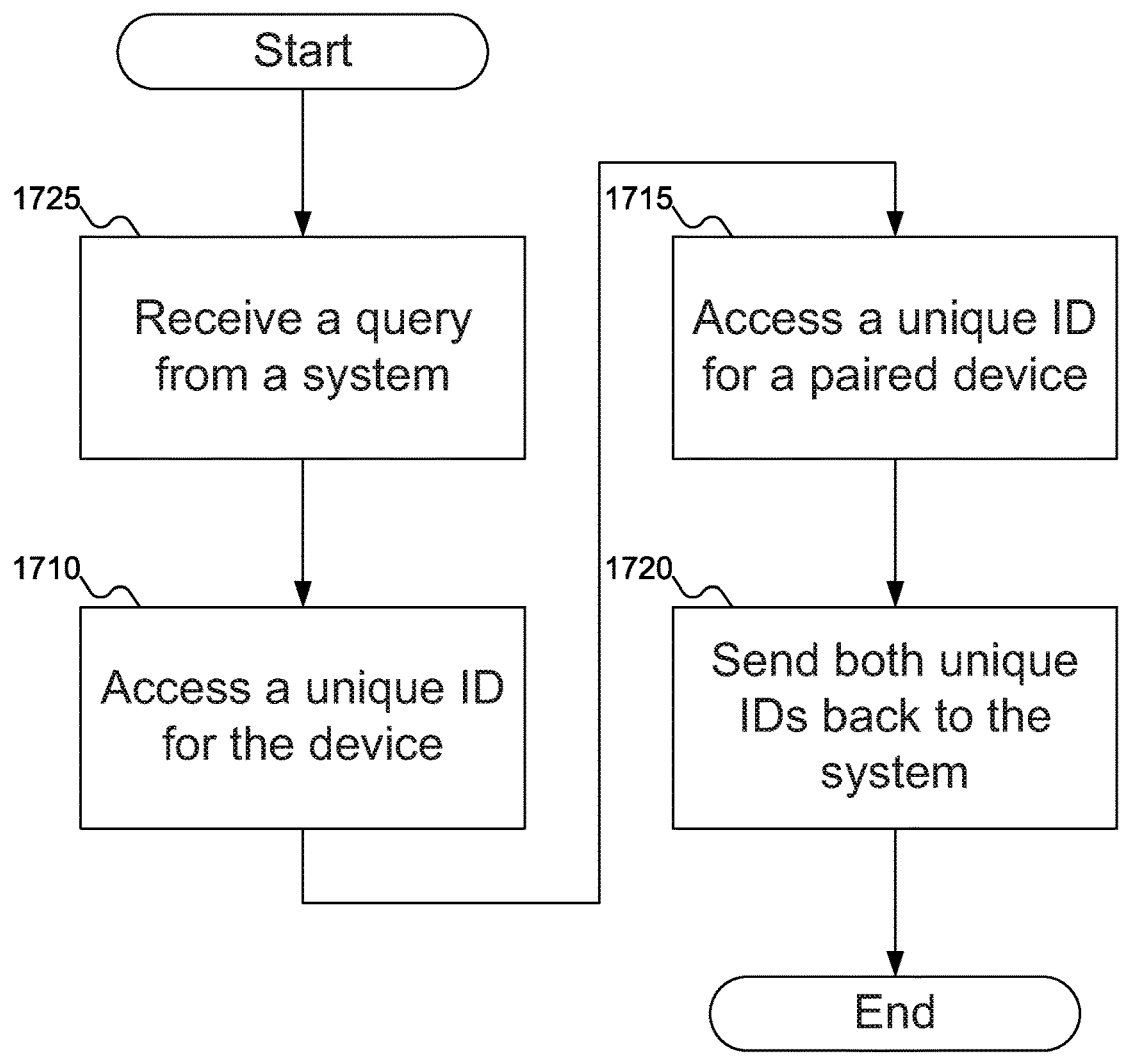
FIG. 17 shows a flowchart of an example procedure for the SSD of FIG. 1 and/or the co-processor of FIG. 1 to respond to a query from the operating system regarding it and its pairing partner, according to an embodiment of the inventive concept.

FIG. 17 shows a flowchart of an example procedure for SSD 125-1 of FIG. 1 and/or co-processor 130-1 of FIG. 1 to respond to a query from operating system 405 of FIG. 5 regarding it and its pairing partner, according to an embodiment of the inventive concept. In FIG. 17, at block 1705, SSD 125-1 and/or co-processor 130-1 of FIG. 1 may receive queries 605 and/or 610 of FIG. 6 from operating system 405 of FIG. 5. At block 1710, SSD 125-1 and/or co-processor 130-1 of FIG. 1 may access pairing information, such as a unique ID or a manufacturer's model number and/or serial number, from storages 505-1 and/or 515-2 of FIG. 5, for SSD 125-1 and/or co-processor 130-1 of FIG. 1. At block 1715, SSD 125-1 and/or co-processor 130-1 of FIG. 1 may access pairing information, such as a unique ID or a manufacturer's model number and/or serial number, from storages 505-2 and/or 515-1 of FIG. 5, for the partner device(s). Finally, at block 1720, SSD 125-1 and/or co-processor 130-1 of FIG. 1 may send the pairing information about the paired devices to operating system 405 of FIG. 5.

Figure 18:
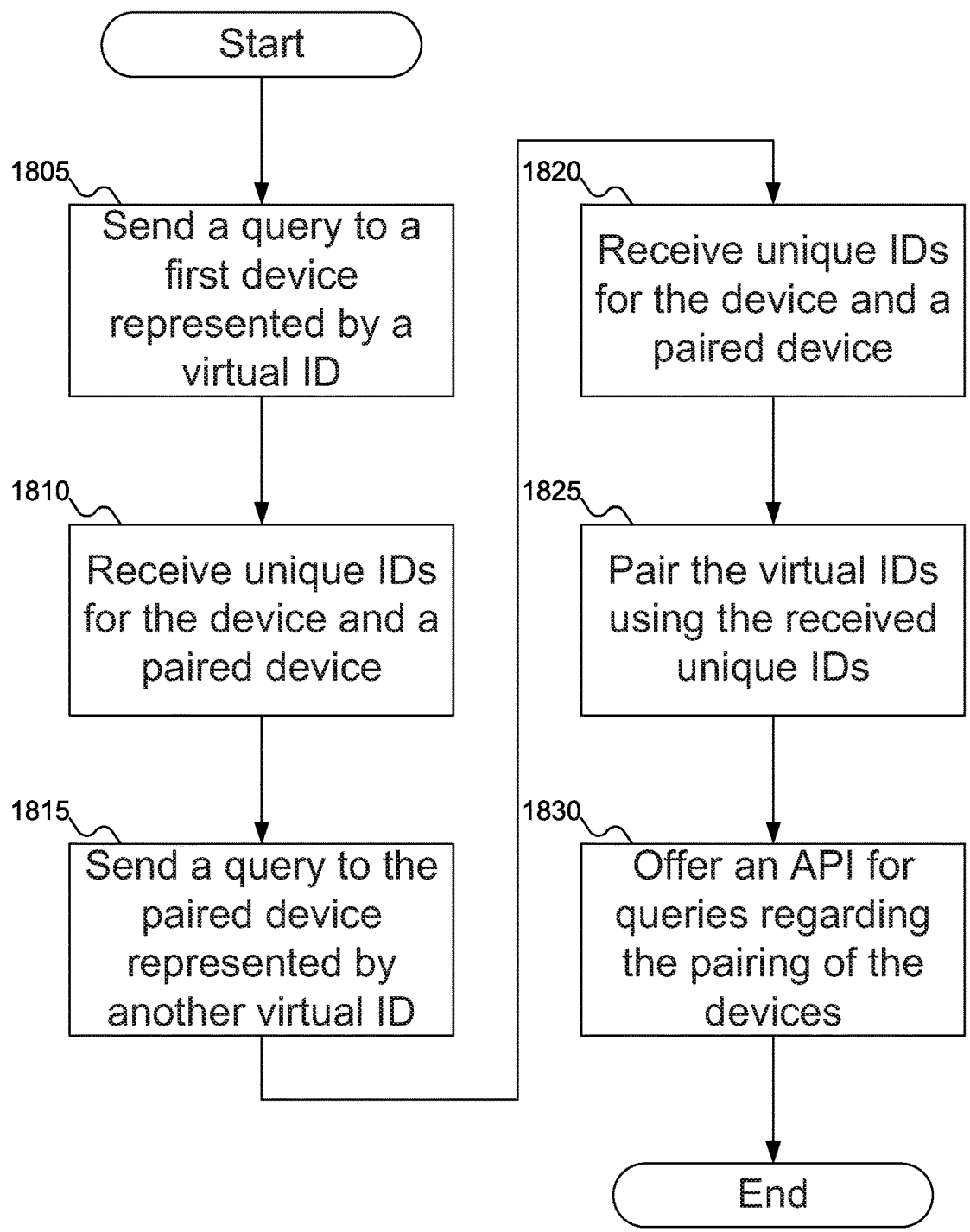
FIG. 18 shows a flowchart of an example procedure for the operating system of FIG. 5 to query the SSD of FIG. 1 and the co-processor of FIG. 1 and pair them, according to an embodiment of the inventive concept.

FIG. 18 shows a flowchart of an example procedure for operating system 405 of FIG. 5 to query 125-1 SSD of FIG. 1 and co-processor 130-1 of FIG. 1 and pair them, according to an embodiment of the inventive concept. In FIG. 18, at block 1805, operating system 405 of FIG. 5 may send a query, such as queries 605 and/or 615 of FIG. 6, to a device represented (to operating system 405 of FIG. 5) by a virtual ID. At block 1810, operating system 405 of FIG. 5 may receive from the device its pairing information. At block 1815, operating system 405 of FIG. 5 may send another query, such as queries 605 and/or 615 of FIG. 6, to another device represented (to operating system 405 of FIG. 5) by another virtual ID. At block 1820, operating system 405 of FIG. 5 may receive from that device its pairing information. At block 1825, operating system 405 of FIG. 5 may determine that the two devices have provided the same pairing information, and pair the device somehow within operating system 405 of FIG. 5. Finally, at block 1830, operating system 405 of FIG. 5 may offer an API to an application that supports queries regarding the pairing of devices.

Figure 19:
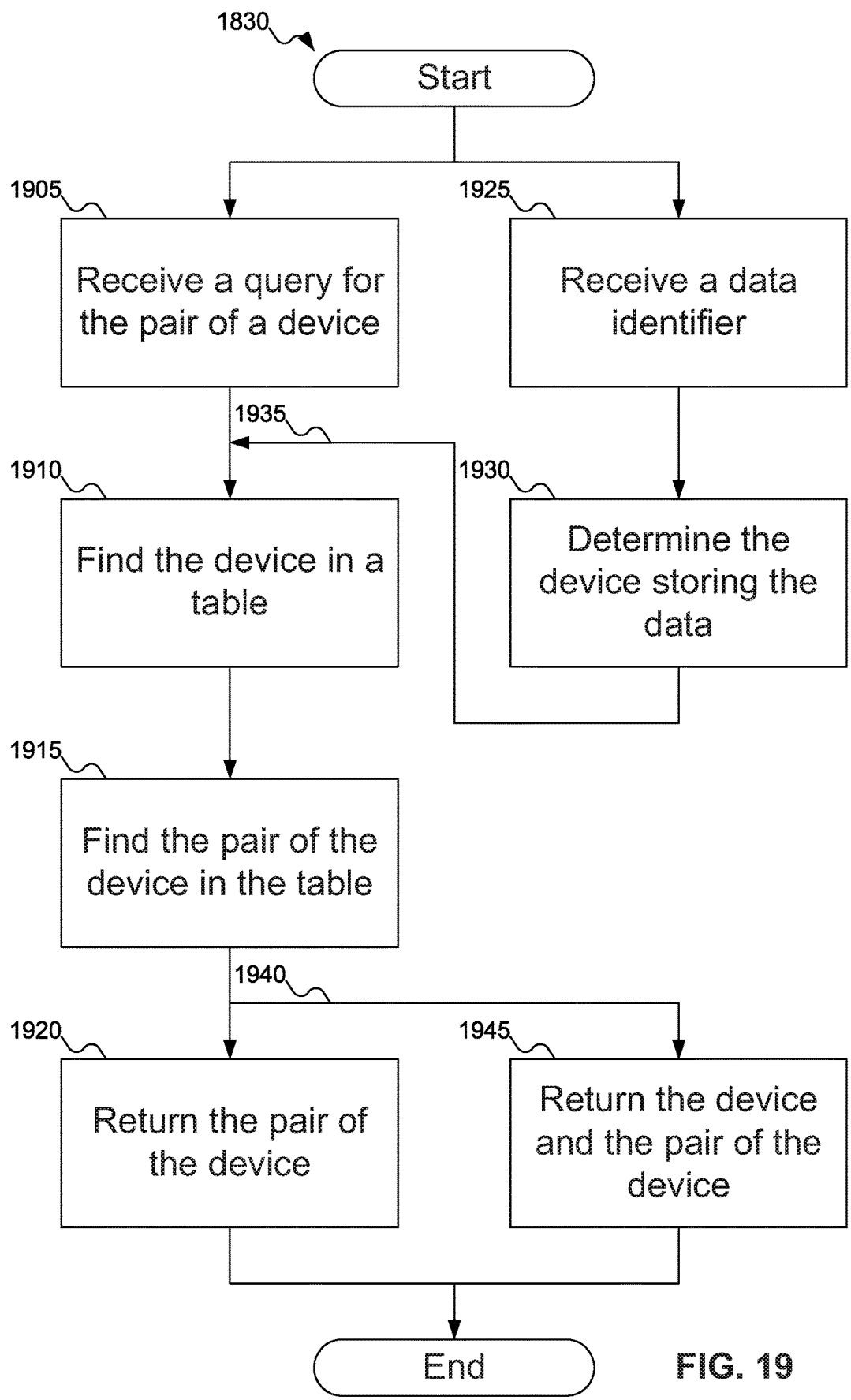
FIG. 19 shows a flowchart of an example procedure for the operating system of FIG. 5 to respond to a query from an application regarding pairing information for a device, according to an embodiment of the inventive concept.

FIG. 19 shows a flowchart of an example procedure for operating system 405 of FIG. 5 to respond to a query from an application regarding pairing information for a device, according to an embodiment of the inventive concept. In FIG. 19, at block 1905, operating system 405 of FIG. 5 may receive from an application a request for the pair for a particular device. At block 1910, operating system 405 of FIG. 5 may find the requested device in a table that stores pairing information. At block 1915, operating system 405 of FIG. 5 may determine the pair(s) for the device in the table. At block 1920, operating system 405 of FIG. 5 may return to the application information about the pair(s) for the device.

Alternatively, at block 1925, operating system 405 of FIG. 5 may receive from an application a request for pairing information regarding a data identifier (such as a file, an object, a key, etc.) At block 1930, operating system 405 of FIG. 5 may determine the device that stores the data identified by the data identifier. At this point, as shown by arrow 1935, operating system 405 of FIG. 5 may perform blocks 1910 and 1915 as described above. Then, as shown by arrow 1940, operating system 405 of FIG. 5 may return to the application information about both the device that stores the data and its pair(s).

In FIGS. 15-19, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

Embodiments of the inventive concept offer technical advantages over the prior art. Embodiments of the inventive concept permit SSDs 125-1 and 125-2 and co-processors 130-1 130-2 of FIG. 1 to determine pairing information about their pairing partner(s). Then, SSDs 125-1 and 125-2 and co-processors 130-1 130-2 of FIG. 1 may provide this pairing information to operating system 405 of FIG. 5, enabling operating system 405 of FIG. 5 to be able to store information about which devices are paired with which other devices. Once operating system 405 of FIG. 5 has the devices appropriately paired, operating system 405 of FIG. 5 may provide this information to an application via an API, enabling applications to request services from co-processors 130-1 and 130-2 of FIG. 1 that are paired with SSDs 125-1 and 125-2 of FIG. 1 that store the data upon which the services are to be performed.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a system, comprising:
  a Solid State Drive (SSD), including:
    a first storage for data;
    a second storage for a unique SSD identifier (ID); and
    and a third storage for a unique co-processor ID;
  a co-processor, including:
    a fourth storage for the unique co-processor ID; and
    a fifth storage for the unique SSD ID; and
  a hardware interface between the SSD and the co-processor.

Statement 2. An embodiment of the inventive concept includes the system according to statement 1, wherein the co-processor includes one of a Field Programmable Gate Array (FPGA), an Application-Specific Integrated Circuit, a Graphics Processing Unit (GPU), a Tensor Processing Unit, an Erasure Coding Controller, and a small processor core.

Statement 3. An embodiment of the inventive concept includes the system according to statement 1, wherein the hardware interface includes one of a System Management Bus (SMBus) an Inter-Integrated Circuit (I2C) bus.

Statement 4. An embodiment of the inventive concept includes the system according to statement 1, wherein the fourth storage includes one of an a one-time programmable (OTP) memory, a Programmable Read-Only Memory (PROM), an Eraseable Programmable Read-Only Memory (EPROM), and an Electrically Erasable Programmable Read-Only Memory (EEPROM).

Statement 5. An embodiment of the inventive concept includes the system according to statement 1, wherein the co-processor is operative to query the SSD for the unique SSD ID and to store the unique SSD ID in the fifth storage.

Statement 6. An embodiment of the inventive concept includes the system according to statement 1, wherein the co-processor is operative to provide the SSD with the unique co-processor ID.

Statement 7. An embodiment of the inventive concept includes the system according to statement 1, wherein the SSD is operative to query the co-processor for the unique co-processor ID and to store the unique co-processor ID in the third storage.

Statement 8. An embodiment of the inventive concept includes the system according to statement 1, wherein the SSD is operative to provide the co-processor with the unique SSD ID.

Statement 9. An embodiment of the inventive concept includes the system according to statement 1, wherein the SSD is operative to receive a query about the SSD and the co-processor out-of-band.

Statement 10. An embodiment of the inventive concept includes the system according to statement 9, wherein the SSD includes a SMBus connection to receive the query out-of-band.

Statement 11. An embodiment of the inventive concept includes the system according to statement 9, wherein the SSD is operative to respond to the query with both the unique SSD ID and the unique co-processor ID.

Statement 12. An embodiment of the inventive concept includes the system according to statement 9, wherein the query includes a Non-Volatile Memory Express (NVMe) Management Interface (MI) command.

Statement 13. An embodiment of the inventive concept includes the system according to statement 1, wherein the co-processor is operative to receive a query about the SSD and the co-processor out-of-band.

Statement 14. An embodiment of the inventive concept includes the system according to statement 13, wherein the co-processor is operative to respond to the query with both the unique SSD ID and the unique co-processor ID.

Statement 15. An embodiment of the inventive concept includes the system according to statement 13, wherein the query includes a Non-Volatile Memory Express (NVMe) Management Interface (MI) command.

Statement 16. An embodiment of the inventive concept includes the system according to statement 1, wherein the SSD is operative to receive a query about the SSD and the co-processor in-band.

Statement 17. An embodiment of the inventive concept includes the system according to statement 16, wherein the SSD includes a Peripheral Component Interconnect Express (PCIe) connection to receive the query in-band.

Statement 18. An embodiment of the inventive concept includes the system according to statement 16, wherein the SSD is operative to respond to the query with both the unique SSD ID and the unique co-processor ID.

Statement 19. An embodiment of the inventive concept includes the system according to statement 16, wherein the query includes a Non-Volatile Memory Express (NVMe) Management Interface (MI) command.

Statement 20. An embodiment of the inventive concept includes a method, comprising:

sending a query from a first device to a second device;
receiving a response at the first device from the second device, the response including a first pairing data;
storing the first pairing data in a second storage in the first device;
accessing a second pairing data from a first storage in the first device; and
sending a second pairing data from the first device to the second device.

Statement 21. An embodiment of the inventive concept includes the method according to statement 20, wherein the first device and the second device each include one of a Field Programmable Gate Array (FPGA), an Application-Specific Integrated Circuit, a Graphics Processing Unit (GPU), a Tensor Processing Unit, an Erasure Coding Controller, and a small processor core.

Statement 22. An embodiment of the inventive concept includes the method according to statement 20, wherein:

sending a query from a first device to a second device includes sending the query from the first device to the second device over a hardware interface between the first device and the second device;
receiving a response at the first device from the second device includes receiving the response at the first device from the second device over the hardware interface between the first device and the second device; and
sending a second pairing data from the first device to the second device includes sending the second pairing data from the first device to the second device over the hardware interface between the first device and the second device.

Statement 23. An embodiment of the inventive concept includes the method according to statement 20, wherein the second storage includes one of an a one-time programmable (OTP) memory, a Programmable Read-Only Memory (PROM), an Eraseable Programmable Read-Only Memory (EPROM), and an Electrically Erasable Programmable Read-Only Memory (EEPROM).

Statement 24. An embodiment of the inventive concept includes a method, comprising:

receiving a query at a first device from a second device;
accessing a first pairing data from a first storage in the first device;
sending a response from the first device to the second device, the response including the first pairing data;
receiving a second pairing data at a first device from a second device; and
storing the second pairing data in a second storage in the first device.

Statement 25. An embodiment of the inventive concept includes the method according to statement 24, wherein the first device and the second device each include one of a Field Programmable Gate Array (FPGA), an Application-Specific Integrated Circuit, a Graphics Processing Unit (GPU), a Tensor Processing Unit, an Erasure Coding Controller, and a small processor core.

Statement 26. An embodiment of the inventive concept includes the method according to statement 24, wherein:

receiving a query at a first device from a second device includes receiving a query at a first device from a second device over a hardware interface between the first device and the second device;
sending a response from the first device to the second device includes sending a response from the first device to the second device over the hardware interface between the first device and the second device; and
receiving a second pairing data at a first device from a second device includes receiving a second pairing data at a first device from a second device over the hardware interface between the first device and the second device.

Statement 27. An embodiment of the inventive concept includes the method according to statement 24, wherein the second storage includes one of an a one-time programmable (OTP) memory, a Programmable Read-Only Memory (PROM), an Eraseable Programmable Read-Only Memory (EPROM), and an Electrically Erasable Programmable Read-Only Memory (EEPROM).

Statement 28. An embodiment of the inventive concept includes a method, comprising: receiving a query at a first device;

accessing a first unique identifier (ID) for the first device from a first storage in the first device;
accessing a second unique ID for a second device from a second storage in the first device, the second device paired with the first device; and
sending a response to the query from the first device, the response including both the first unique ID and the second unique ID.

Statement 29. An embodiment of the inventive concept includes the method according to statement 28, wherein:

receiving a query at a first device includes receiving the query at the first device out-of-band; and
sending a response to the query from the first device includes sending the response to the query from the first device out-of-band.

Statement 30. An embodiment of the inventive concept includes the method according to statement 29, wherein:

receiving the query at the first device out-of-band includes receiving the query at the first device over a System Management Bus (SMBus) connection; and
sending a response to the query from the first device out-of-band includes sending the response to the query from the first device over the SMBus connection.

Statement 31. An embodiment of the inventive concept includes the method according to statement 28, wherein:

receiving a query at a first device includes receiving the query at the first device in-band; and
sending a response to the query from the first device includes sending the response to the query from the first device in-band.

Statement 32. An embodiment of the inventive concept includes the method according to statement 31, wherein:

receiving the query at the first device in-band includes receiving the query at the first device over a Peripheral Component Interconnect Express (PCIe) connection; and
sending a response to the query from the first device in-band includes sending the response to the query from the first device over the PCIe connection.

Statement 33. An embodiment of the inventive concept includes the method according to statement 28, wherein the query includes a Non-Volatile Management Express (NVMe) Management Interface (MI) command.

Statement 34. An embodiment of the inventive concept includes a method, comprising:

sending a first query to a Solid State Drive (SSD) represented by a first virtual Identifier (ID);
receiving from the SSD, in response to the first query, a unique SSD ID and a unique co-processor ID;

sending a second query to a co-processor represented by a second virtual ID;

receiving from the co-processor, in response to the second query, the unique SSD ID and the unique co-processor ID; and pairing the first virtual ID and the second virtual ID.

Statement 35. An embodiment of the inventive concept includes the method according to statement 34, wherein sending a first query to a Solid State Drive (SSD) includes sending the first query to the SSD out-of-band.

Statement 36. An embodiment of the inventive concept includes the method according to statement 35, wherein sending the first query to the SSD out-of-band includes sending the first query to the SSD over a System Management Bus (SMBus) connection.

Statement 37. An embodiment of the inventive concept includes the method according to statement 34, wherein sending a first query to a Solid State Drive (SSD) includes sending the first query to the SSD in-band.

Statement 38. An embodiment of the inventive concept includes the method according to statement 37, wherein sending the first query to the SSD in-band includes sending the first query to the SSD over a Peripheral Component Interconnect Express (PCIe) connection.

Statement 39. An embodiment of the inventive concept includes the method according to statement 34, wherein the first query includes a Non-Volatile Management Express (NVMe) Management Interface (MI) command.

Statement 40. An embodiment of the inventive concept includes the method according to statement 34, wherein sending a second query to a co-processor includes sending the second query to the co-processor out-of-band.

Statement 41. An embodiment of the inventive concept includes the method according to statement 40, wherein sending the second query to the S co-processor SD out-of-band includes sending the second query to the co-processor over an SMBus connection.

Statement 42. An embodiment of the inventive concept includes the method according to statement 34, wherein the second query includes a Non-Volatile Management Express (NVMe) Management Interface (MI) command.

Statement 43. An embodiment of the inventive concept includes the method according to statement 34, wherein pairing the first virtual ID and the second virtual ID includes pairing the first virtual ID and the second virtual ID responsive to both the SSD and the co-processor returning the unique SSD ID and the unique co-processor ID.

Statement 44. An embodiment of the inventive concept includes the method according to statement 34, further comprising offering an Application Programming Interface (API) operative to respond to queries regarding the pairing of the first virtual ID and the second virtual ID.

Statement 45. An embodiment of the inventive concept includes the method according to statement 44, further comprising:

receiving a pairing query for a pair for the first virtual ID; and returning the second virtual ID responsive to the pairing of the first virtual ID with the second virtual ID.

Statement 46. An embodiment of the inventive concept includes the method according to statement 45, wherein:

receiving a pairing query for a pair for the first virtual ID includes receiving the pairing query for the pair for the first virtual ID from an application via the API; and returning the second virtual ID responsive to the pairing of the first virtual ID with the second virtual ID includes returning the second virtual ID to the application responsive to the pairing of the first virtual ID with the second virtual ID.

Statement 47. An embodiment of the inventive concept includes the method according to statement 44, further comprising:

receiving a file query for a pair associated with a file;

identifying the SSD as storing the file; and returning the first virtual ID and the second virtual ID responsive to the file query.

Statement 48. An embodiment of the inventive concept includes the method according to statement 47, wherein:

receiving a file query for a pair associated with a file includes receiving the file query for the pair associated with the file from an application via the API;

returning the first virtual ID and the second virtual ID responsive to the file query includes returning the first virtual ID and the second virtual ID to the application responsive to the file query.

Statement 49. An embodiment of the inventive concept includes an article, comprising a non-transitory storage medium, the non-transitory storage medium having stored thereon instructions that, when executed by a machine, result in:

sending a query from a first device to a second device;

receiving a response at the first device from the second device, the response including a first pairing data;

storing the first pairing data in a second storage in the first device;

accessing a second pairing data from a first storage in the first device; and sending a second pairing data from the first device to the second device.

Statement 50. An embodiment of the inventive concept includes the article according to statement 49, wherein the first device and the second device each include one of a Field Programmable Gate Array (FPGA), an Application-Specific Integrated Circuit, a Graphics Processing Unit (GPU), a Tensor Processing Unit, an Erasure Coding Controller, and a small processor core.

Statement 51. An embodiment of the inventive concept includes the article according to statement 49, wherein:

sending a query from a first device to a second device includes sending the query from the first device to the second device over a hardware interface between the first device and the second device;

receiving a response at the first device from the second device includes receiving the response at the first device from the second device over the hardware interface between the first device and the second device; and sending a second pairing data from the first device to the second device includes sending the second pairing data from the first device to the second device over the hardware interface between the first device and the second device.

Statement 52. An embodiment of the inventive concept includes the article according to statement 49, wherein the second storage includes one of an a one-time programmable (OTP) memory, a Programmable Read-Only Memory (PROM), an Eraseable Programmable Read-Only Memory (EPROM), and an Electrically Erasable Programmable Read-Only Memory (EEPROM).

Statement 53. An embodiment of the inventive concept includes an article, comprising a non-transitory storage medium, the non-transitory storage medium having stored thereon instructions that, when executed by a machine, result in:

receiving a query at a first device from a second device;
accessing a first pairing data from a first storage in the first device;
sending a response from the first device to the second device, the response including the first pairing data;
receiving a second pairing data at a first device from a second device; and
storing the second pairing data in a second storage in the first device.

Statement 54. An embodiment of the inventive concept includes the article according to statement 53, wherein the first device and the second device each include one of a Field Programmable Gate Array (FPGA), an Application-Specific Integrated Circuit, a Graphics Processing Unit (GPU), a Tensor Processing Unit, an Erasure Coding Controller, and a small processor core.

Statement 55. An embodiment of the inventive concept includes the article according to statement 53, wherein:
receiving a query at a first device from a second device includes receiving a query at a first device from a second device over a hardware interface between the first device and the second device;
sending a response from the first device to the second device includes sending a response from the first device to the second device over the hardware interface between the first device and the second device; and
receiving a second pairing data at a first device from a second device includes receiving a second pairing data at a first device from a second device over the hardware interface between the first device and the second device.

Statement 56. An embodiment of the inventive concept includes the article according to statement 53, wherein the second storage includes one of an a one-time programmable (OTP) memory, a Programmable Read-Only Memory (PROM), an Eraseable Programmable Read-Only Memory (EPROM), and an Electrically Erasable Programmable Read-Only Memory (EEPROM).

Statement 57. An embodiment of the inventive concept includes an article, comprising a non-transitory storage medium, the non-transitory storage medium having stored thereon instructions that, when executed by a machine, result in:
receiving a query at a first device;
accessing a first unique identifier (ID) for the first device from a first storage in the first device;
accessing a second unique ID for a second device from a second storage in the first device, the second device paired with the first device; and
sending a response to the query from the first device, the response including both the first unique ID and the second unique ID.

Statement 58. An embodiment of the inventive concept includes the article according to statement 57, wherein:
receiving a query at a first device includes receiving the query at the first device out-of-band; and
sending a response to the query from the first device includes sending the response to the query from the first device out-of-band.

Statement 59. An embodiment of the inventive concept includes the article according to statement 58, wherein:
receiving the query at the first device out-of-band includes receiving the query at the first device over a System Management Bus (SMBus) connection; and
sending a response to the query from the first device out-of-band includes sending the response to the query from the first device over the SMBus connection.

Statement 60. An embodiment of the inventive concept includes the article according to statement 57, wherein:
receiving a query at a first device includes receiving the query at the first device in-band; and
sending a response to the query from the first device includes sending the response to the query from the first device in-band.

Statement 61. An embodiment of the inventive concept includes the article according to statement 60, wherein:
receiving the query at the first device in-band includes receiving the query at the first device over a Peripheral Component Interconnect Express (PCIe) connection; and
sending a response to the query from the first device in-band includes sending the response to the query from the first device over the PCIe connection.

Statement 62. An embodiment of the inventive concept includes the article according to statement 57, wherein the query includes a Non-Volatile Management Express (NVMe) Management Interface (MI) command.

Statement 63. An embodiment of the inventive concept includes an article, comprising a non-transitory storage medium, the non-transitory storage medium having stored thereon instructions that, when executed by a machine, result in:
sending a first query to a Solid State Drive (SSD) represented by a first virtual Identifier (ID);
receiving from the SSD, in response to the first query, a unique SSD ID and a unique co-processor ID;
sending a second query to a co-processor represented by a second virtual ID;
receiving from the co-processor, in response to the second query, the unique SSD ID and the unique co-processor ID; and
pairing the first virtual ID and the second virtual ID.

Statement 64. An embodiment of the inventive concept includes the article according to statement 63, wherein sending a first query to a Solid State Drive (SSD) includes sending the first query to the SSD out-of-band.

Statement 65. An embodiment of the inventive concept includes the article according to statement 64, wherein sending the first query to the SSD out-of-band includes sending the first query to the SSD over a System Management Bus (SMBus) connection.

Statement 66. An embodiment of the inventive concept includes the article according to statement 63, wherein sending a first query to a Solid State Drive (SSD) includes sending the first query to the SSD in-band.

Statement 67. An embodiment of the inventive concept includes the article according to statement 66, wherein sending the first query to the SSD in-band includes sending the first query to the SSD over a Peripheral Component Interconnect Express (PCIe) connection.

Statement 68. An embodiment of the inventive concept includes the article according to statement 63, wherein the first query includes a Non-Volatile Management Express (NVMe) Management Interface (MI) command.

Statement 69. An embodiment of the inventive concept includes the article according to statement 63, wherein sending a second query to a co-processor includes sending the second query to the co-processor out-of-band.

Statement 70. An embodiment of the inventive concept includes the article according to statement 69, wherein sending the second query to the S co-processor SD out-of-band includes sending the second query to the co-processor over an SMBus connection.

Statement 71. An embodiment of the inventive concept includes the article according to statement 63, wherein the second query includes a Non-Volatile Management Express (NVMe) Management Interface (MI) command.

Statement 72. An embodiment of the inventive concept includes the article according to statement 63, wherein pairing the first virtual ID and the second virtual ID includes pairing the first virtual ID and the second virtual ID responsive to both the SSD and the co-processor returning the unique SSD ID and the unique co-processor ID.

Statement 73. An embodiment of the inventive concept includes the article according to statement 63, the non-transitory storage medium having stored thereon further instructions that, when executed by the machine, result in offering an Application Programming Interface (API) operative to respond to queries regarding the pairing of the first virtual ID and the second virtual ID.

Statement 74. An embodiment of the inventive concept includes the article according to statement 73, the non-transitory storage medium having stored thereon further instructions that, when executed by the machine, result in:
receiving a pairing query for a pair for the first virtual ID; and
returning the second virtual ID responsive to the pairing of the first virtual ID with the second virtual ID.

Statement 75. An embodiment of the inventive concept includes the article according to statement 74, wherein:
receiving a pairing query for a pair for the first virtual ID includes receiving the pairing query for the pair for the first virtual ID from an application via the API; and
returning the second virtual ID responsive to the pairing of the first virtual ID with the second virtual ID includes returning the second virtual ID to the application responsive to the pairing of the first virtual ID with the second virtual ID.

Statement 76. An embodiment of the inventive concept includes the article according to statement 73, the non-transitory storage medium having stored thereon further instructions that, when executed by the machine, result in:
receiving a file query for a pair associated with a file;
identifying the SSD as storing the file; and
returning the first virtual ID and the second virtual ID responsive to the file query.

Statement 77. An embodiment of the inventive concept includes the article according to statement 76, wherein:
receiving a file query for a pair associated with a file includes receiving the file query for the pair associated with the file from an application via the API;
returning the first virtual ID and the second virtual ID responsive to the file query includes returning the first virtual ID and the second virtual ID to the application responsive to the file query.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A first device, comprising:
a hardware interface connecting the first device and a second device,
a first storage for a unique first device identifier (ID), the unique first device ID associated with the first device; and
a second storage for a unique second device ID, the unique second device ID associated with the second device,
wherein the first device is configured to receive a query from an operating system about the first device and the second device and to respond to the query from the operating system with the unique first device ID and the unique second device ID.

2. The first device according to claim 1, wherein:
the first device includes a storage device, including a third storage for data and a controller to manage writing the data to the third storage and reading the data from the third storage; and
the second device includes one of a Field Programmable Gate Array (FPGA), a Graphics Processing Unit (GPU), a Tensor Processing Unit, and an Erasure Coding Controller.

3. The first device according to claim 2, wherein the storage device includes a Solid State Drive (SSD).

4. The first device according to claim 1, wherein:
the first device includes one of a Field Programmable Gate Array (FPGA), a Graphics Processing Unit (GPU), a Tensor Processing Unit, and an Erasure Coding Controller; and
the second device includes a storage device, including a third storage for data and a controller to manage writing the data to the third storage and reading the data from the third storage.

5. The first device according to claim 4, wherein the storage device includes a Solid State Drive (SSD).

6. The first device according to claim 1, wherein the first device is configured to receive the unique second device ID from the second device.

7. The first device according to claim 1, wherein the first device is configured to provide the second device with the unique first device ID.

8. A method, comprising:
sending a query from a first device to a second device;
receiving a response at the first device from the second device, the response including a first data, the first data identifying the second device;
storing the first data in a second storage in the first device;
accessing a second data from a first storage in the first device, the second data identifying the first device; and
sending the second data from the first device to the second device
wherein the first device is configured to receive a query from an operating system about the first device and the second device and to respond to the query from the operating system with the first data and the second data.

9. The method according to claim 8, wherein:
the first device includes a storage device, including a third storage for data and a controller to manage writing the data to the third storage and reading the data from the third storage; and
the second device includes one of a Field Programmable Gate Array (FPGA), a Graphics Processing Unit (GPU), a Tensor Processing Unit, and an Erasure Coding Controller.

10. The method according to claim 9, wherein the storage device includes a Solid State Drive (SSD).

11. The method according to claim 8, wherein:
the first device includes one of a Field Programmable Gate Array (FPGA), a Graphics Processing Unit (GPU), a Tensor Processing Unit, and an Erasure Coding Controller; and the second device includes a storage device, including a third storage for data and a controller to manage writing the data to the third storage and reading the data from the third storage.

12. The method according to claim 11, wherein the storage device includes a Solid State Drive (SSD).

* * * * *